United States Patent
Ernst

(10) Patent No.: US 6,170,832 B1
(45) Date of Patent: Jan. 9, 2001

(54) FLUID RING SEAL SYSTEM AND METHOD

(76) Inventor: Hermann H. F. Ernst, 20 Crowley Dr., Old Saybrook, CT (US) 06475

(*) Notice: Under 35 U.S.C. 154(b), the term of this patent shall be extended for 0 days.

(21) Appl. No.: 09/048,690

(22) Filed: Mar. 26, 1998

(51) Int. Cl.⁷ .................................................. F16J 15/447
(52) U.S. Cl. .............................................................. 277/412
(58) Field of Search ................................... 277/412, 423, 277/427, 428, 429

(56) References Cited

U.S. PATENT DOCUMENTS

| | | |
|---|---|---|
| 3,765,688 * | 10/1973 | Junker ............................. 277/429 X |
| 3,853,327 | 12/1974 | Nellis . |
| 4,383,720 | 5/1983 | Ernst . |
| 4,386,780 * | 6/1983 | Dernedde ........................ 277/429 X |
| 4,426,088 | 1/1984 | Ernst . |
| 4,436,311 | 3/1984 | Brandon . |
| 4,667,967 | 5/1987 | Deuring . |
| 4,721,313 | 1/1988 | Pennink . |
| 4,743,034 | 5/1988 | Kakabaker et al. . |
| 4,989,883 | 2/1991 | Orlowski . |
| 5,046,718 | 9/1991 | Hay, II . |
| 5,148,687 | 9/1992 | Tamei et al. . |
| 5,193,974 | 3/1993 | Hufford . |
| 5,221,095 | 6/1993 | Orlowski . |
| 5,228,700 * | 7/1993 | Biesold et al. ................... 277/429 X |
| 5,487,611 | 1/1996 | Dreschmann et al. . |
| 5,533,737 | 7/1996 | Borowski . |
| 5,603,510 | 2/1997 | Sanders . |
| 5,865,597 * | 2/1999 | Ozawa ............................. 277/427 X |

FOREIGN PATENT DOCUMENTS

| | | |
|---|---|---|
| 1 285 268 | 2/1964 | (DE) . |
| 196 27 048 A1 | 1/1998 | (DE) . |

* cited by examiner

Primary Examiner—Anthony Knight
Assistant Examiner—Karlena D. Schwing
(74) Attorney, Agent, or Firm—Heslin & Rothenberg, P.C.

(57) ABSTRACT

A fluid ring seal system and method for use with a shaft encircled by a fluid medium chamber including a fluid medium. The system includes a fluid medium sealing segment in fluid flow communication with the fluid medium chamber. The fluid medium sealing segment substantially maintains the fluid medium within the chamber and the fluid medium sealing segment. A contaminant sealing segment is in fluid flow communication with the fluid medium sealing segment and with an outer environment. The contaminant sealing segment substantially prevents a contaminant from migrating into the fluid medium sealing segment. A fluid pathway extends between the fluid medium sealing segment and the contaminant sealing segment along an innermost radius defined by each respective sealing segment. Alternatively or additionally, a stator separates the fluid medium sealing segment and the contaminant sealing segment.

39 Claims, 13 Drawing Sheets

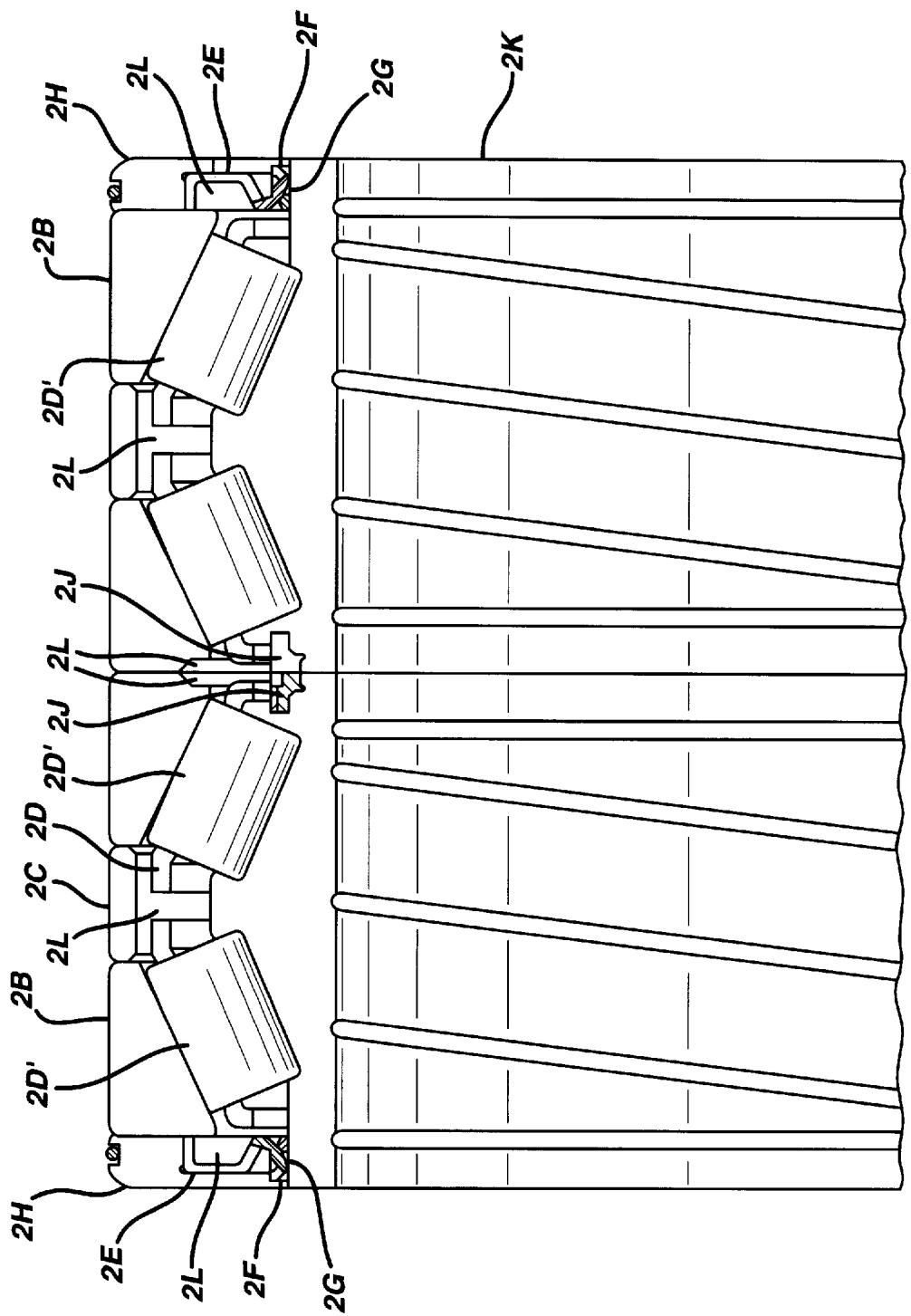

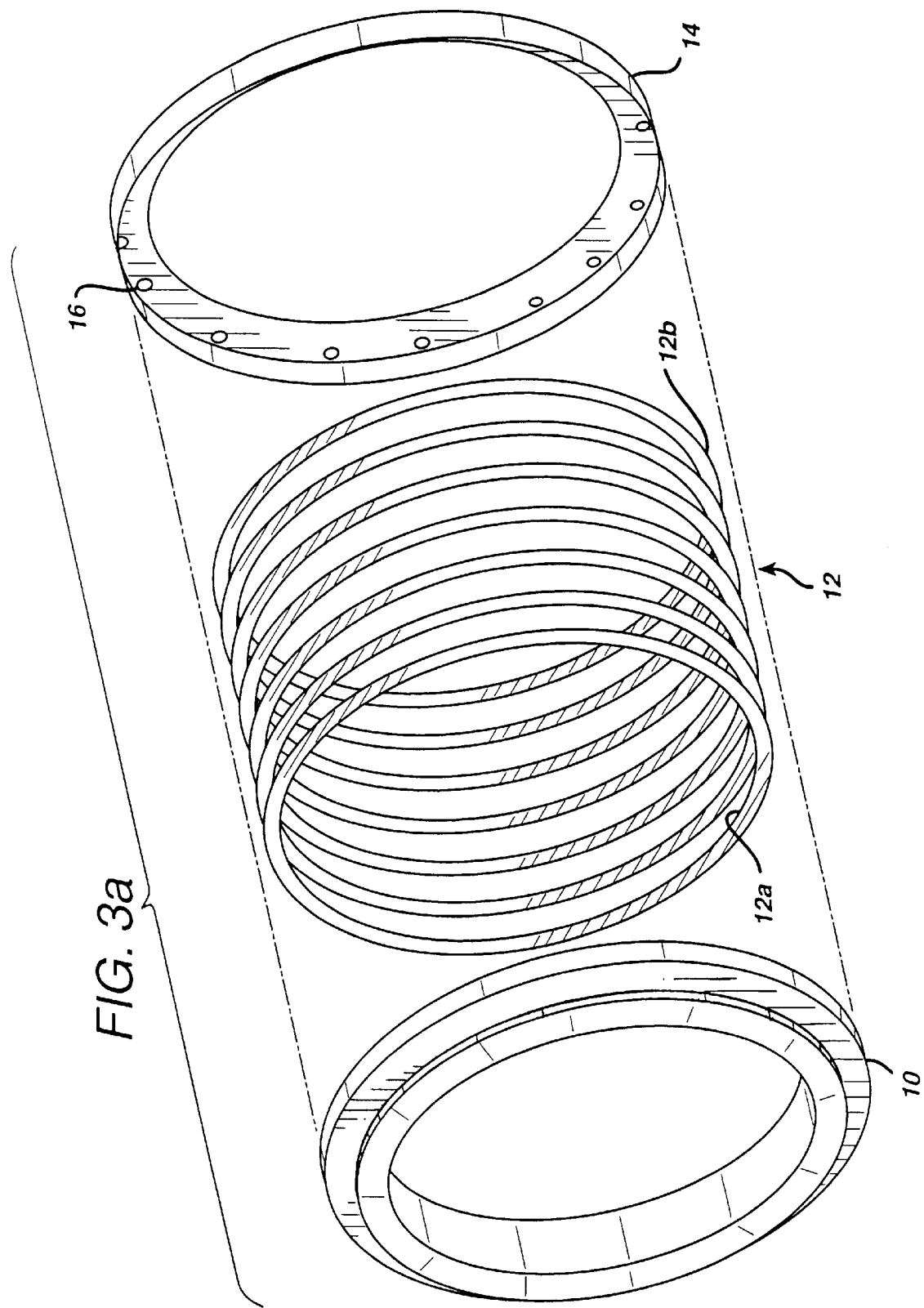

FLUID RING SEAL SYSTEM AND METHOD

FIELD OF THE INVENTION

The invention relates generally to the field of sealing a fluid medium. More particularly, the invention concerns fluid ring seals and a system that employs multiple fluid ring seals to seal the fluid medium in a fluid medium chamber and seal contaminants out of the fluid medium chamber, which chamber preferably encircles a shaft mounted for rotation.

BACKGROUND OF THE INVENTION

Various sealing means exist in the prior art for sealing a fluid medium in a fluid medium chamber. In particular, as depicted in FIGS. 1a, 1b and 2, static seals are conventionally used. For example, FIGS. 1a and 1b depict a conventional rail car axle bearing assembly. The assembly includes a bearing assembly housing B. Within the housing B a spacer C is positioned interiorly midway between the housing ends. A bearing cone D, comprising a pair of such cones sit inside the housing pressed against either side of the spacer. A series of bearings D' are mounted within the bearing ring. A seal ring E sits against the bearing cone D, where again a pair of such rings sit inside the housing pressed against either side of the respective bearing cones D.

Within the ring seal E is a static seal F. The static seal engages an outer surface of a wear ring G in a rotatable frictional relationship. The wear ring G sits against the bearing cone D, where again a pair of such rings pressing engage against either side of the respective bearing cones D. The wear ring is engaged by either an end plate H with connecting means such as a bolt I (bearing outside mounting arrangement) or a backing plate J that removably engages a shoulder of an axle or shaft K. The end plate and connecting means enable pre-loading of the bearing assembly as desired.

In rotational operation, for example, the components D, C, G, H, I, J and K rotate and the components B, E and F are fixed or stationary relative thereto. The static seal F rotatably seals by engaging an outer surface of the wear ring G in a rotatable frictional relationship. A fluid medium chamber L is formed between the ring seal E and the bearing cone D. A fluid medium such as oil or grease is located within the chamber L. By the frictional relationship created between the static seal and the wear ring, the seal F serves to prevent the fluid medium from escaping out of the chamber, and also, prevent contaminants (e.g., substances in an outer environment other the fluid medium such as air, water dirt and debris) from migrating into the chamber L.

FIG. 2 depicts another example of a bearing assembly that employs a static type seal in a conventional steel rolling mill shaft application. The components of this system are generally analogous to the components of the rail car axle system in function. Obviously the geometry of the components differ but they operate largely the same way.

These and other types of bearing assembly arrangements known in the prior art have several disadvantages. Arrangements that employ static seals have a tendency to wear out relatively quickly. Once the static seal looses its ability to consistently maintain frictional contact with the rotating wear ring, leakage into and out of the fluid medium chamber is inevitable. Further, such arrangements attempt to accomplish the two tasks of sealing in the fluid medium and sealing out contaminants with one component. Still further, such arrangements rely on the frictional relationship which has obvious disadvantages to inhibiting free rotation of the rotating system.

Still other arrangements that do not necessarily employ static seals suffer from similar disadvantages. For example, such arrangements do not consider fluid medium flow characteristics or utilize distinct yet cooperating components to circulate the fluid medium into moving walls for fluid containment and/or contaminant prevention and/or temperature regulation. Further, such arrangements do not actively circulate a fluid medium and utilize pressure differentials created by the arrangement to contain the fluid medium and prevent the migration of contaminants. Still further, other disadvantages that exist in the prior art arrangements will become clear after considering the features and advantages of the present invention.

A fluid ring sealing system is needed that overcomes the disadvantages of the prior art sealing arrangements. Accordingly, the present invention includes features that overcome these and other disadvantages. The seals and seal systems disclosed in the prior art do not offer the flexibility and inventive features of my system and method. As will be described in greater detail hereinafter, the features of the present invention differ from those previously proposed.

SUMMARY OF THE INVENTION

According to the present invention there is provided a fluid ring seal system and method for use with a shaft encircled by a fluid medium chamber including a fluid medium. The system includes a fluid medium sealing segment in fluid flow communication with the fluid medium chamber, wherein the fluid medium sealing segment is downstream of the fluid medium chamber and substantially maintains the fluid medium within the fluid medium chamber and the fluid medium sealing segment. The system also includes a contaminant sealing segment in fluid flow communication with the fluid medium sealing segment and with an outer environment, wherein the contaminant sealing segment substantially prevents a contaminant from migrating into the fluid medium sealing segment. Further, the system may include the contaminant sealing segment axially disposed downstream of the fluid medium sealing segment and a fluid pathway extending between the fluid medium sealing segment and the contaminant sealing segment along an innermost radius defined by each respective sealing segment, wherein the sealing segments are preferably in fluid flow communication with each other substantially only through the fluid pathway.

Another feature of the invention relates to the system including, additionally or alternatively, the contaminant sealing segment located downstream of the fluid medium sealing segment and a stator at least partially separating the fluid medium sealing segment and the contaminant sealing segment, the stator having a stator arm extending into a rotor cavity of each of the respective sealing segments.

Still another feature of the invention concerns the axial and/or radial positioning of the sealing segments relative to one another and/or the bearing assembly.

According to other features of the invention there is provided a charger ring located upstream of the fluid medium sealing segment and in the fluid medium chamber, wherein the charger ring automatically maintains a ring of fluid medium in proximity to a radial charger channel defined between the fluid medium sealing segment and the charger ring.

Yet another feature of the invention relates to a fluid medium circulation path, wherein the fluid medium circulation path flows in communication with the fluid medium chamber and the fluid medium sealing segment.

According to still further features of the invention there is provided a method for sealing a fluid medium in and contaminants out of a fluid ring seal system including a fluid medium chamber. Preferably the method comprises the steps of: rotating a fluid medium sealing segment; rotating a contaminant sealing segment; circulating a flow of the fluid medium between the fluid medium sealing segment and the fluid medium chamber and along a stator located between the fluid medium sealing segment and the contaminant sealing segment; circulating a flow of a contaminant between the contaminant sealing segment and the outer environment and along the stator; and, reducing a temperature of the fluid medium as it is circulating between the fluid medium sealing segment and the fluid medium chamber by circulating the flow of fluid medium along a temperature regulated stator.

DESCRIPTION OF THE DRAWINGS

Other features and advantages of my invention will become more readily apparent upon reference to the following description when taken in conjunction with the accompanying drawings, which drawings illustrate several embodiments of my invention.

FIG. 2 is an assembled partial cross-sectional side view of a conventional steel rolling mill shaft bearing assembly mounted on a shaft and employing a conventional static seal system.

FIG. 3b is a partial exploded perspective view of a rotor, pumping rings and rotor cover of a fluid medium sealing segment seen in FIG. 3.

DETAILED DESCRIPTION OF THE PREFERRED EMBODIMENT

Figure 3:
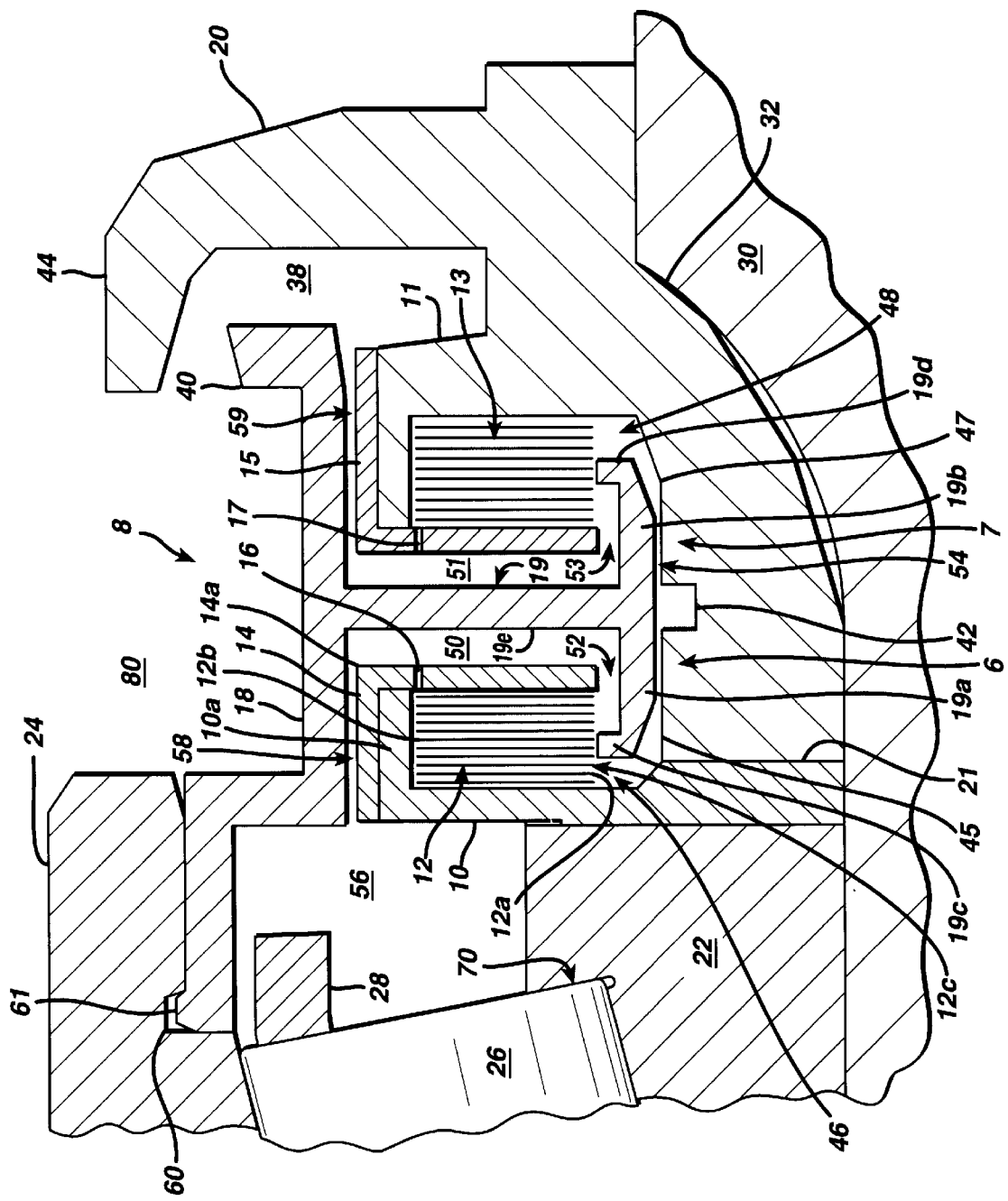
FIG. 3 is a partial cross-sectional side view of an embodiment of the invention for a bearing inside mounting arrangement on a rail car axle, schematically depicting pumping rings mounted in respective sealing segments of the fluid ring seal system, all in accordance with the features of the invention.

Referring now to the drawings the invention comprises a fluid ring seal system, for example one embodiment includes the system 8 shown in FIGS. 3 and 3b in a side-by-side sealing segment arrangement. The system 8 contains two main segments, a fluid medium sealing segment and a contaminant sealing segment. These two segments operate relatively independent of one another though they rotate together around a common shaft or axle 30. As used herein, the terms downstream and upstream refer to the positioning of a component relative to another component along a fluid path potentially extending from a fluid medium chamber 56 to an outer environment 80 of the system 8.

The fluid medium sealing segment generally comprises that part of the system 8 that is downstream of the fluid medium chamber and upstream of a fluid pathway 54. Preferably, the fluid pathway extends between the fluid medium sealing segment and the contaminant sealing segment along an innermost radius 45 and 47 defined by each respective sealing segment. Still further, it is preferred that the sealing segments are in fluid flow communication with each other substantially only through the fluid pathway. The sealing segment includes at least a fluid medium rotor 10, a fluid medium rotor cover 14 a fluid medium rotor cavity 46 and a fluid medium ring cavity 50. Inside rotor 10 are a number of similar pumping rings 12. The rotor cover has at least one discharge hole 16 which communicates fluid between the interior of rotor cavity 46 and the fluid cavity 50.

Preferably, three to twelve holes 16 will be located around the periphery of the rotor cover. The holes are preferably sized large enough to allow fluid medium to exit the rotor cavity sufficiently during rotation to preferably maintain a flow of fluid medium between the fluid medium sealing segment and the fluid medium chamber. Also, a periphery of each hole is preferably located flush with the outer radius of the rotor cavity. This prevents pooling of fluid against that rotor cover and a portion of the rotor adjacent an outside radius 12b of the pumping rings during operation or rotation of the system. However, the holes could be positioned inwardly away from the outer radius of the rotor cavity and the features of the invention could still be practiced.

It is understood that the seal in question can be located on a rolling axle or shaft 30 and that the rotor 10, preferably friction or interference fit together with rotor cover 14, and pumping rings 12 all rotate with the axle. The pumping rings 12 are captured in the ring shaped rotor cavity 46 created by rotor 10 and rotor cover 14. Although the pumping rings are only shown schematically in the drawings, they preferably have particular characteristics and comprise the number of rings necessary to at least partially fill the rotor cavity.

For example, the pumping rings are somewhat spaced apart from one another by having a wavy structure or raised surfaces (not shown) to cause spacing. Also, the outside radius 12b of each ring is preferably sized slightly smaller than the inner radius of the horizontal portion of the rotor 10. Further, the inside radius 12a of each ring is preferably sized the same or slightly smaller than the inner radius of the rotor cover 14 adjacent thereto. The sizing is particularly advantageous because it is preferred that the rings 12 axially and radially float within the rotor cavity. This also further enables the fluid collected at the outside radius 12b of the rings to circulate out of the rotor cavity through the holes 16. The rings may be constructed out of any semi-rigid to rigid material that has a flexible characteristic. Although largely dependent on intended use, excellent results are contemplated when the rings are constructed of any metal material, e.g, galvanized sheet metal, aluminum flashing or stainless steel.

During shaft rotation, the sealing segment rotates and in turn the rings rotate. This rotation causes fluid medium to be circulated from the inside diameter 12a to the outside diameter 12b and expelled at discharge hole 16. Because the rotor cover is also rotating, the fluid being discharged will circulate along the surface of that cover to the outer periphery 14a and some of the fluid will be transferred inwardly along the surface of stationary stator 19 and/or the interior wall of stator housing 18. Any such fluid medium that makes its way to gap 52 will eventually reach the inside diameter of the pumping rings again wherein it will be circulated back to the outer diameter thereof and out the hole 16. This action is continuous and it substantially prevents the fluid medium from entering fluid pathway 54, and especially preferably during shaft rotation.

The principle purpose of the fluid medium sealing segment is to prevent the loss of fluid medium from fluid medium chamber 56. The fluid medium may comprise any member from the group consisting of a gas, a grease, an oil, a combination of a grease and an oil or the like that one desires to maintain within the fluid medium chamber. The sealing segment is effective in so maintaining the fluid medium because fluid that escapes from chamber 56 through fluid medium sealing segment channel 58 will circulate along stator housing 18 to the stator 19 and eventually find its way to gap 52. Upon passing through gap 52 it will generally be picked up or sucked by the pumping rings 12 and returned to the outer diameter thereof and forced out of hole 16. Little, and preferably no fluid, can pass into fluid pathway 54 so that there comes a point during shaft rotation when no more fluid can leave chamber 56, thus preventing the loss of fluid therefrom.

To better ensure that the circulating fluid is picked up by the pumping rings, the stator 19 preferably has stator arm 19a, reaching axially into the rotating rotor cavity 46 of the fluid medium sealing segment. The stator arm 19a is joined with, preferably rigidly in one piece as shown, a stator body 19e, and preferably in a perpendicular relationship thereto. Further, excellent results are also obtained when a stator arm protrusion ring 19c is included with the stator arm. With these preferred features, circulating fluid is thereby better directed into the radial gaps 12c between the pumping rings 12 and is substantially prevented from reaching the pathway 54.

Figure 4:
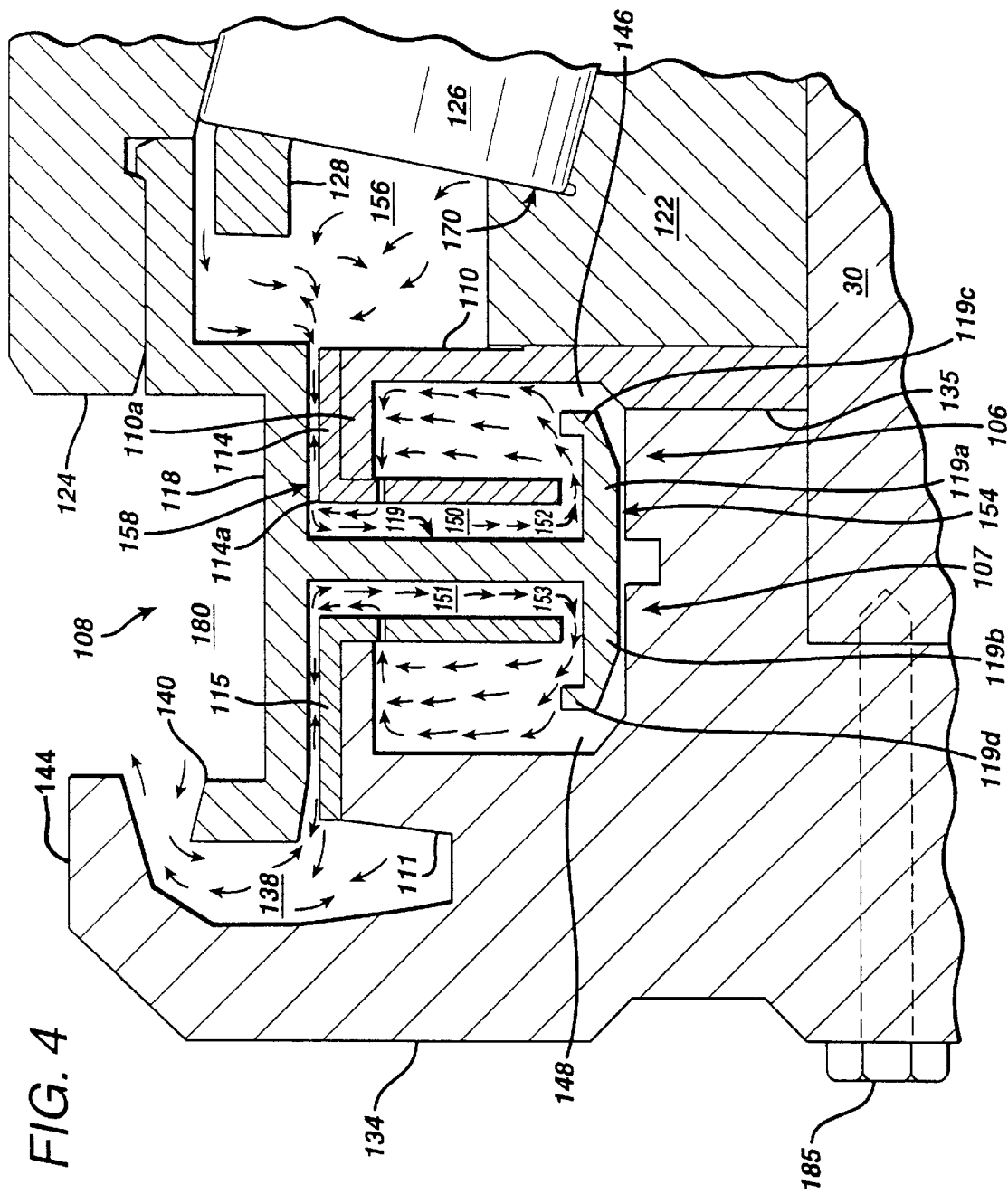
FIG. 4 is a partial cross-sectional side view of an embodiment of the invention for a bearing outside mounting arrangement on a rail car axle, not depicting pumping rings but rather depicting the flow paths of the fluid medium if there were pumping rings in the fluid ring seal system and the axle was rotating, all in accordance with the features of the invention.

The exact pattern of fluid flow between the fluid medium sealing segment and chamber 56 is not known with certainty. However, it is known that there is an exchange of fluid between the two, as generally shown in FIG. 4 for example. Positive flow of the fluid medium from the interior of the segment to the channel 58 is practically assured. The fluid medium in the channel 58 and ring cavity 50 proximate the stator 19 substantially rotates at slightly less than ½ the speed of the rotating seal rotor 10 and rotor cavity. Thus, the fluid medium inside the rotor cavity 46 and in proximity to the rotor cover rotates at practically the same angular velocity as the pumping rings and rotor and rail car axle 30, and therefore is subject to higher pressure forces.

It is also believed that there is a secondary fluid flow phenomenon which is akin to boundary layer fluid flow dynamics which permits a layer of fluid to move in one direction along the stationary walls (e.g., the stator housing and stator) while the boundary flow on the rotating surfaces (e.g., rotor and rotor cover) is moving in another direction. This constant exchange or circulating of fluid maintains an equilibrium and any possible leaking fluid medium is substantially prevented from escaping into pathway 54 after passing through gap 52.

Turn now to the contaminant sealing segment. This segment generally comprises that part of the system 8 that is downstream of the fluid pathway 54 and upstream of a outer environment ring cavity 38. The mechanical structure and function here is analogous to that shown and described for the fluid medium sealing segment. In operation, segment 48 functions as follows. First, the contaminant sealing segment preferably does not contain a fluid medium. It is preferably in communication with mainly ambient air at ambient air pressure in the ring cavity 38. As the pumping rings 13 rotate, a similar action occurs as occurred with the fluid in the fluid medium sealing segment 46. That is, air and particles, or water (i.e., a contaminant) that might enter the ring cavity fluid channel 59 and find its way into the rotor cavity 48 of the contaminant sealing segment, will be circulated or pumped centrifugally and will be emitted through hole 17 into contaminant ring cavity 51.

Here again, because of the boundary layer action some of the contaminants will be drawn radially inwardly along stator 19 and can find its way to the contaminant gap 53 and the inner diameter of the pumping rings 13. This action substantially prevents any air, particles, dirt (i.e. collectively contaminants) from finding its way to fluid pathway 54. Thus, there is preferably an effectively blocked fluid pathway 54 extending between the contaminant sealing segment and the lubricating sealing segment. Furthermore, the pumping action by each respective sealing segment can positively prressurize each sealing segment and thereby serves to further prevent the exchange of fluid or contaminants through the fluid pathway. Within the contaminant sealing segment, the stator 19 also preferably includes a stator arm 19b and protrusion ring 19d, effective in a similar way as the arm 19a and ring 19c.

The backing plate 20 preferably comprises a unitary piece including the rotor 11 and a substantial portion of the bearing housing assembly, for reasons described hereinafter. The configuration of backing plate 20 and removal lip 40 is such that rain and other contaminants are more effectively prevented from entering the sealing system. First, removal lip 40 is shaped so that any rain falling on the stator housing 18 will be prevented from flowing directly into the ring cavity 38. Instead, it will simply drop off the bottom portion of stator housing 18. Also, backing plate 20 is provided with a protective flange 44 which helps block the entry of rain or contaminants being projected in the direction of the ring cavity 38. If any such contaminant should happen to find its way into ring cavity 38, it will simply flow to the bottom of the cavity and be discharged at the bottom. Preferably, very little, if any, will enter channel 59.

An additional feature concerns grease reservoir 42 located in pathway 54. The reservoir serves as a small fluid medium reservoir during the initial fluid ring seal system installation phase. The reservoir 42 can be provided with a grease or other type lubricating fluid medium prior to the system 8 installation.

The side-by-side systems 8 and 108 can be further characterized by their positioning relative to one another. For example, it is preferred that the contaminant sealing segment may be axially disposed opposing the fluid medium sealing segment where at least a portion of the contaminant sealing segment is axially co-planar with the fluid medium sealing segment, as in FIGS. 3, 4, 6 and 7 for example. Still further in this regard the contaminant sealing segment may be substantially completely axially co-planar with the fluid medium sealing segment, as seen in FIGS. 3 and 4 for example.

Another aspect of this invention concerns a complimentary embodiment comprising a second side-by-side fluid ring seal system 108, FIG. 4. The system 108 comprises a bearing outside mounting arrangement. In application, a pair of fluid ring seal systems 8 and 108 seal fluid medium in a pair of opposed axle bearings, such as the bearing mounting arrangement seen in FIGS. 1a and 1b. For example, system 8 is positioned adjacent the inside of a typical rail car axle bearing and system 108 is positioned adjacent the outside of a typical rail car axle bearing. Together, the systems 8 and 108 axially locate and pre-load a typical rail car axle bearing on the rail car axle and moreover serve to maintain the presence of fluid medium within the axle bearing assembly and prevent contaminants from migrating therein.

Bearing pre-loading is accomplished by a bolt 185, for example (and preferably three bolts), bolting the end plate 134 to the axle 30, as conventionally known. The end plate inner ring 135 is thereby forced against rotor 110. In turn, the rotor 110 presses against bearing inner ring or cone 122 and then the axial clamping force acts through the contact surfaces of bearing inner ring 22 (FIG. 1) of rotor 10 which in turn is forced against backing plate inner ring 21 and the backing plate 20. Backing plate 20, however, firmly abuts against the axle shoulder 32 and thus acts as a stop to any force applied against it from the direction of the rotor 10. In this way, the bolts in the end plate 134 axially clamp all bearing and seal rotor parts against axle shoulder 32. By selectively adjusting the torque applied to the bolts, the pre-loading of the bearings 26 and 126 (e.g. tapered roller bearings 26 separated from each other by bearing cage 28 in the bearing cone) can be controlled.

The components and operation of system 108 are very similar to those of system 8, except that system 108 is inverted relative to system 8. The backing plate 20 corresponds to the end plate 134 in operation but they differ slightly in configuration and connection to the rail car axle. Otherwise, as shown in the drawing figures, corresponding system components are numbered similarly and differ essentially only by a numbering increment of 100.

In combination, the respective fluid medium sealing segments and the contaminant sealing segments of each system 8 and 108 function to prevent leakage of fluid medium out of the chambers 56 and 156 respectively and the ingress of contaminants into the chambers. This invention has a further advantage of dividing the tasks of sealing fluid within the chamber fluid medium chamber and preventing a contaminant from migrating into the fluid medium chamber. It preferably confines them to two related, yet separate, sealing segments comprising the fluid ring seal system 8 or 108, without the serious side effects of friction.

As should be well understood and as depicted in the drawings, the systems 8 and 108 preferably do not rely on or employ frictional relationships between rotating and stationary seal components to prevent leakage of fluid medium out of or contaminants into the system during rotation. The system is preferably essentially a non-frictional system. For example, in reference to system 8, the pumping rings within each rotor cavity 46 and 48 respectively are loosely retained there and can move independent of each other and the respective rotors 10 and 11. The rotors and the pumping rings are preferably not in contact with the stator 19, but rather are preferably separated therefrom and move relative thereto. Generally, to avoid frictional and wearing body contact between rotating and stationary seal components, all stator and rotor surfaces of the sealing segments are preferably separated by a gap of at least nominal size (e.g., about 0.1 to 1.0 mm). Consequently, this invention produces a system that lasts longer, considerably reduces power consumption and overall provides a more reliable, durable sealing arrangement with preferably little to no leakage.

Further, the features of the invention enhance bearing performance because the lubricating segment of this invention generates little friction and utilizes a temperature reducing feature provided by the combination of the sealing segments. That is, the contaminant sealing segment is air cooled and serves to cool the stator 19 therebetween and in turn the stator 19 cools a flow of fluid medium coming into contact therewith in the cavity 50. Substantially lower fluid medium temperatures have been measured in field-like experimentation, as compared to temperatures measured in bearing arrangements using conventional seals.

Still further, the inherently low friction prevailing in the fluid ring seal system minimizes air/fluid medium temperature increases inside the operating fluid ring seal assembly itself. This in turn translates to a lower overall fluid medium chamber 56 and bearing assembly or cone operating temperature and longer fluid medium life.

Yet further, the configuration and operation of this fluid ring seal system promotes fluid medium circulation in an active fashion through critical locations in the bearing assembly (e.g, the shoulder section 70) thereby lowering bearing frictional losses and contributing to better bearing lubrication at lower operating temperatures within the bearing assembly.

Further features of the invention concern the special geometry and configurations that make the systems 8 and 108 easy to assemble and disassemble in components. For example, stator arms 19a, 19b, 119a, 119b and respective protrusion rings 19c, 19d, 119c, 119d are preferably dimensioned to the same or smaller diameter as the cover plates 14, 15 and 114, 115, respectively, to allow simple rotor assembly with the stator. During assembly, the covers 14, 15 and 114, 115, respectively, and the pumping rings are positionable past the arms and protrusion rings into an assembled position as shown in FIGS. 3 and 4.

As another example, stator housings 18 and 118 have removal rings 40 and 140, respectively. These rings serve not only to keep contaminants out of the systems but also to be engageable with a tool for installing and removing the systems 8 and 108 to and from the stationary bearing housings 24 and 124, respectively, and rail car axle 30. The system 8 is maintained in position relative to the tapered roller bearing 26 by the combination of backing plate 20 which is removably fixed to the axle 30 by conventional means, and stator housing 18 which is removably fixed to stationary bearing housing 24 via an integral snap ring 61 engaging into snap ring groove 60. The system 108 is similarly maintained in position by corresponding components.

Still further preferred features of the invention concern the backing plate 20 and end plate 134. Preferably these are configured to engage not only the axle 30, but to also serve as the rotors 11 and 111 for contaminant segments 48 and 148, respectively. In this way, the number of system components is reduced as compared to existing traditional elastomeric sealing systems that require completely separate components for the sealing system. However, separate components could be utilized as desired to practice the features of this invention. For example, in reference to the prior art rail car axle arrangement seen in FIGS. 1a and 1b, the prior art components H, G, F, L and E could be replaced by the FIG. 4 fluid ring seal system of the present invention. Also, prior art components J, G, E, F and L could be replaced by the FIG. 3 fluid ring seal system of the present invention. Prior art components B, C, D, D', I and K are preferably employed in the present invention as conventionally used in the art.

The components of the present invention that replace the just listed prior art components could be constructed of any rigid material. However, though depending on use and except as stated differently herein, excellent results are obtained when the components (e.g, rotors, rotor covers, stator, stator housing, and backing plate are made of metal. For example, in a rail car application cast iron may be preferred whereas in a steel rolling mill application it may be machined steel, cast steel, stamped steel or stainless steel formed by such a process.

Figure 5A:
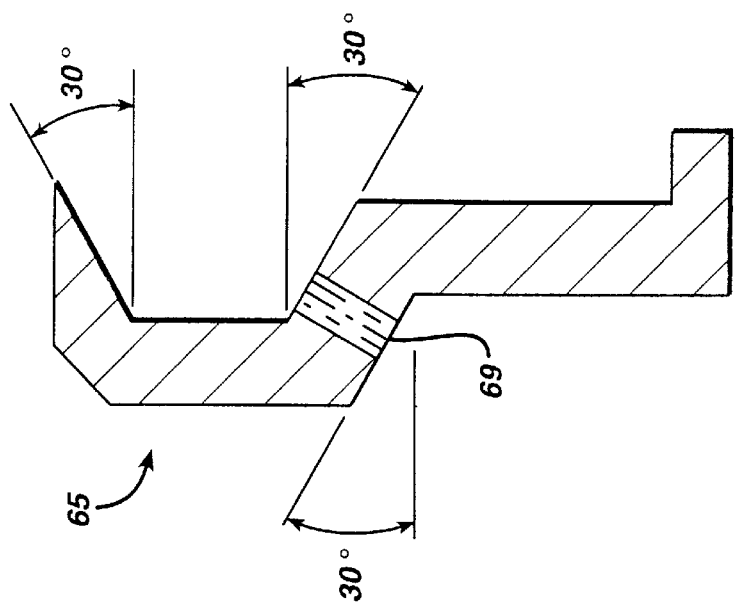
FIG. 5a is a partial cross-sectional side view of another embodiment of the charger ring of FIG. 5.
Figure 5:
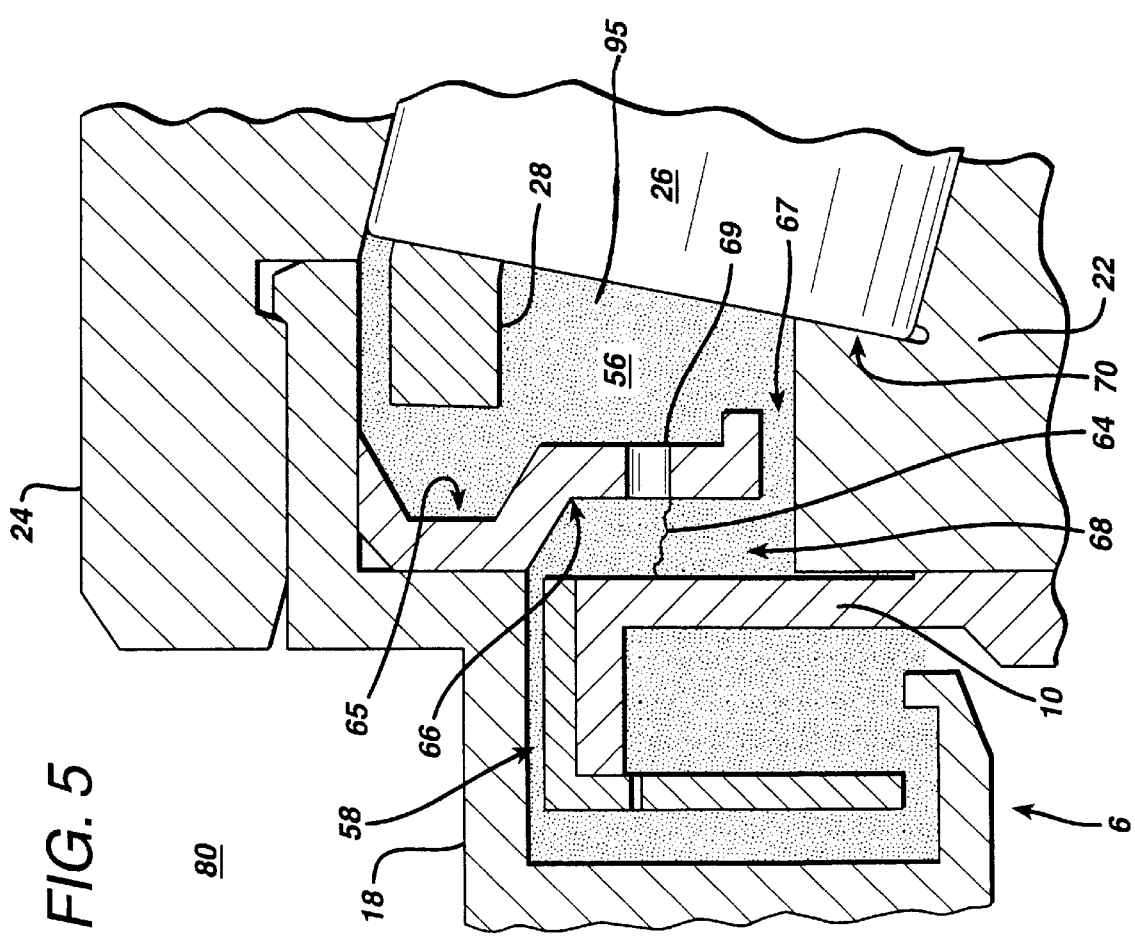
FIG. 5 is a partial cross-sectional side view of another embodiment of the invention for any bearing mounting arrangement, here including a charger ring in a fluid medium chamber, all in accordance with the features of the invention.

Another embodiment of this invention includes a charger ring 65, as seen in FIGS. 5 and 5a. This ring could be combined with either system 8 or 108 shown in FIGS. 3 and 4, where reference is made here to system 8 as an example. The ring 65 includes a charger ring gap 67 defined between the end of the ring 65 and the bearing inner ring 22. The ring 65 may also include a charger ring hole 69, described hereafter. Inbetween the charge ring and the rotor 10 is a radial charger channel 68.

The charger ring 65 is connected to the stationary stator housing 18 by appropriate means, such as welding, bonding, fastening, forming integral, or the like. The charger ring is automatically maintains and/or retains, before and during axle rotation, under preferably most to all operating conditions, fluid medium around the outer periphery of the rotor 10, i.e., proximate the channel 68 in communication with the fluid channel 58. In particular, the charger ring causes fluid medium to form a ring of fluid medium 64 in cavity 68. In effect then, the entire fluid medium chamber and components 56, 26, and 28 of the system are sealed off from the outside environment because of the fluid ring 64. For example, the fluid ring can act as a barrier to humid atmospheric air entering channel 58 in any mode of operation ranging from high speed axle rotation to no speed axle rotation. That is, the fluid ring better effectively closes off any gas conveying fluid passageway that may form between the boundary layers in channel 58.

During axle rotation, the pumping and recirculation action occurring because of the fluid medium sealing segment, as previously discussed, causes fluid medium to automatically circulate through charger ring hole 69 (preferably comprising a number of such holes around the radius of the ring 65) and the gap 67. The inner diameter of the fluid ring is determined by the inner diameter of the charger ring hole 69. Through circulation along the stationary charger ring wall 66, fluid migrates or circulates back through gap 67 into the bearing cavity 56 and is purposely directed against the face of the bearing 26 to enhance bearing lubrication, such as at the shoulder section 70. Also, due to the recirculation of fluid between the fluid medium sealing segment and the chamber 56, any frictional heat generated in the cavities 68 and 56 by the rotating fluid medium, or by other means, is preferably automatically regulated to the temperature level of the fluid medium in the ring fluid medium sealing segment.

FIG. 5a shows another embodiment of the charger ring. Here, the hole 69 is located along a portion of the charger ring projecting away from the fluid medium sealing segment, rather than parallel to the sealing segment. In certain situations, the projection away location is preferred for maintaining a smaller ring of fluid in proximity to the charger channel.

Another embodiment of this invention comprises fluid ring seal systems 208, 308, 408 and 508 as seen in FIGS. 6, 7, 8a, 8b, 9 and 10, which are configured as "over-under" systems. These systems are structurally and functionally analogous to the systems 8 and 108, except as noted hereafter. As shown in the drawing figures, corresponding system components are numbered similarly to those of system 8 and differ essentially only by a numbering increment of 200, 300, 400 and 500 respectively.

Generally, systems 208, 308, 408 and 508 differ from systems 8 and 108 in that systems 208, 308, 408 and 508 comprise an over-under configuration wherein their respective contaminant sealing segment is positioned in the system relatively over the fluid medium sealing segment. That is, the contaminant sealing segment may be disposed at a first radius greater than a second radius of the fluid medium sealing segment and at least a portion of the contaminant sealing segment may be in different axial planes from the fluid medium sealing segment, e.g., FIGS. 6, 7, 8a, 8b and 9. Alternatively, the contaminant sealing segment could be substantially completely in different axial planes from the fluid medium sealing segment, e.g., FIGS. 8a, 8b and 9.

One obvious advantage to this configuration is it enables a more compact fluid ring seal system regarding axial spacing. This is particularly desirable in the systems 408 and 508 (FIGS. 8a and 8b) which are adapted for use as steel rolling mill fluid ring seal assemblies, because seal system space is limited to minimize rolling mill shaft deflection. For example, even at large rolling mill shaft bearing diameters, the fluid ring seal system can be within A axial inch thick or even smaller.

Figure 6:
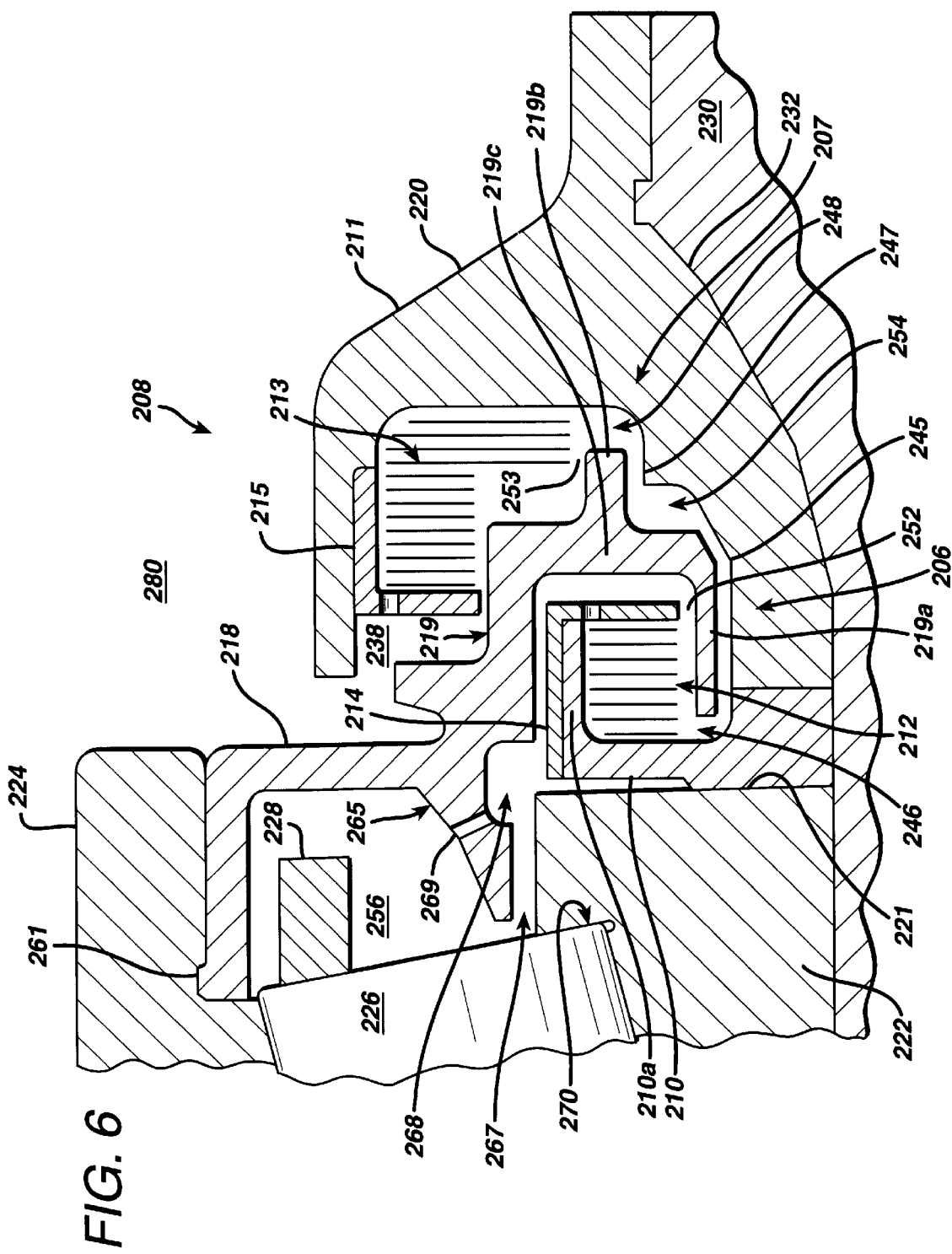
FIG. 6 is a partial cross-sectional side view of another embodiment of the invention for a bearing inside mounting arrangement on a rail car axle, schematically depicting pumping rings mounted in respective sealing segments of the fluid ring seal system, all in accordance with the features of the invention.
Figure 7:
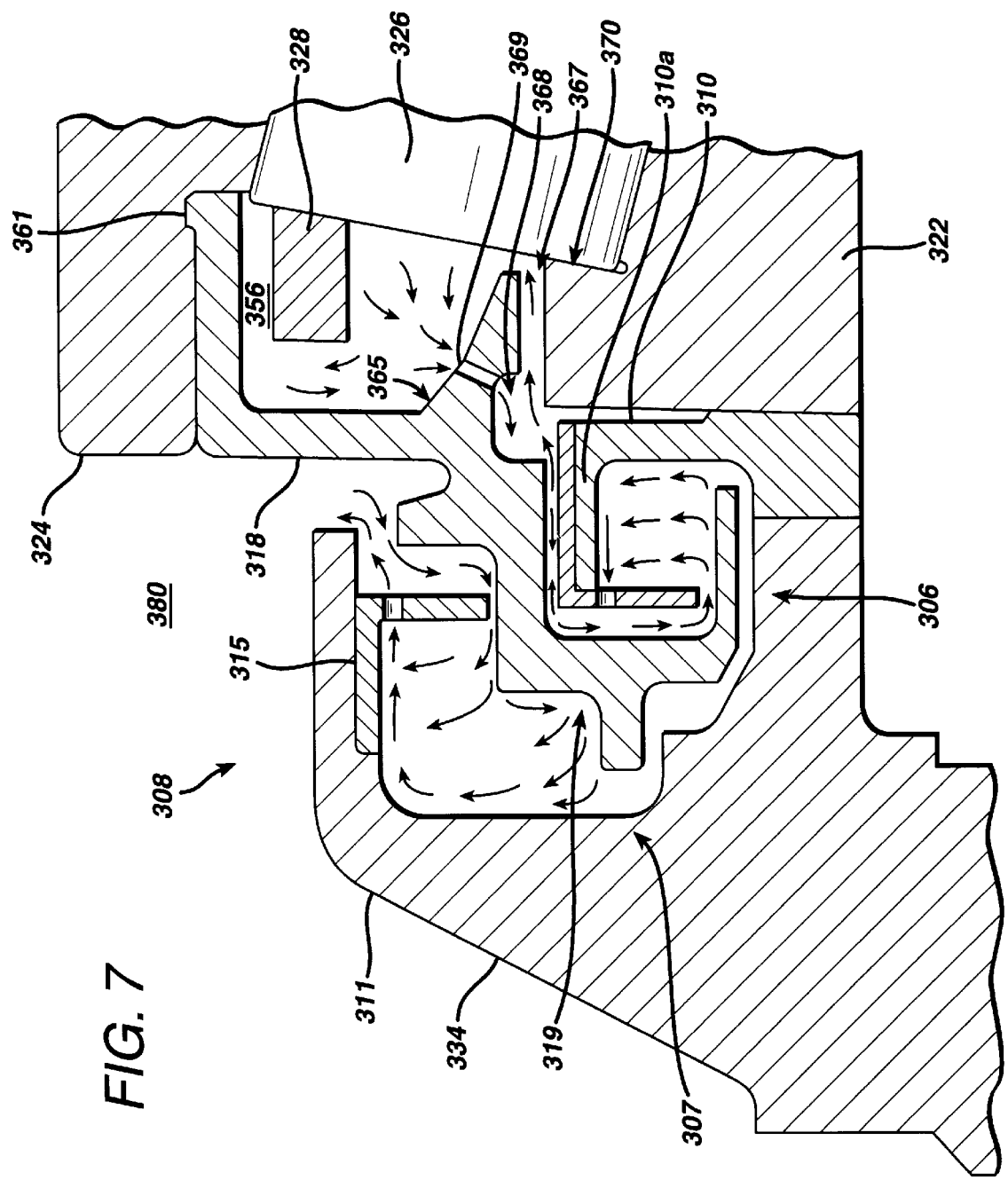
FIG. 7 is a partial cross-sectional side view of an embodiment of the invention for a bearing outside mounting arrangement on a rail car axle, not depicting pumping rings but rather depicting the flow paths of the fluid medium if there were pumping rings in the fluid ring seal system and the axle was rotating, all in accordance with the features of the invention.

Turning to FIGS. 6 and 7, systems 208 and 308 each have a contaminant sealing segment positioned relatively over a fluid medium sealing segment. In system 308, the contaminant rotor is an integral part of the end plate, while the fluid medium rotor is a separate component for ease of assembly. Preferably, the contaminant and fluid medium stator housings are integral parts and fitted into the bearing stator housing by a snap ring joint in an analogous way as systems 8 and 108.

System 208 is very analogous in structure and function to that of system 308. In both systems 208 and 308, preferably the fluid ring seal stator housing is also equipped with a charger ring 265 and 365 respectively. For illustration purposes, reference will only be made to system 208 and both are assumed to function analogously except where stated differently. In operation fluid medium located radially outward by the bearing rollers and bearing cage will recirculate radially inward along the inside of housing wall 218. The moving fluid will then penetrate through hole 269 and fill the radial charger channel 268. Next, the fluid will be forced by fluid ring seal rotor rotation into the gap 267 between stationary charger ring 265 and rotating bearing ring 222 and forced into the free spaces between the bearing. Thereby fluid is directed to the bearing ring shoulder section 270 and opposing bearing faces for effectively recirculating fluid medium into bearing cavities. The channel 268 and the gap 267 preferably remain filled with fluid medium and effectively prevent the influx of possible humid air into the bearing cavity 256.

Figure 8A:
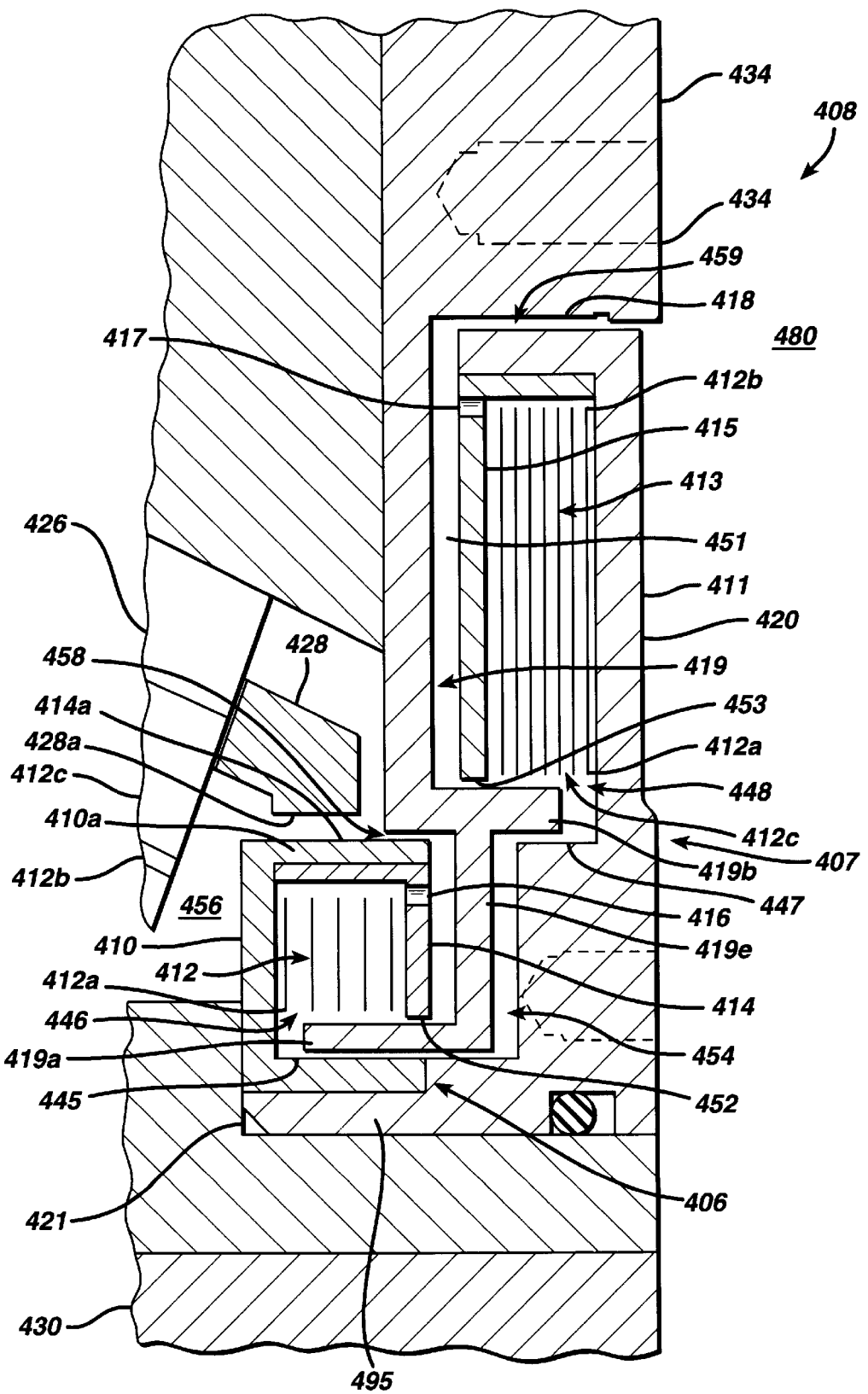
FIG. 8a is a partial cross-sectional side view of an embodiment of the invention for a bearing mounting arrangement on a steel rolling mill shaft, schematically depicting pumping rings mounted in respective sealing segments of the fluid ring seal system, all in accordance with the features of the invention.
Figure 8B:
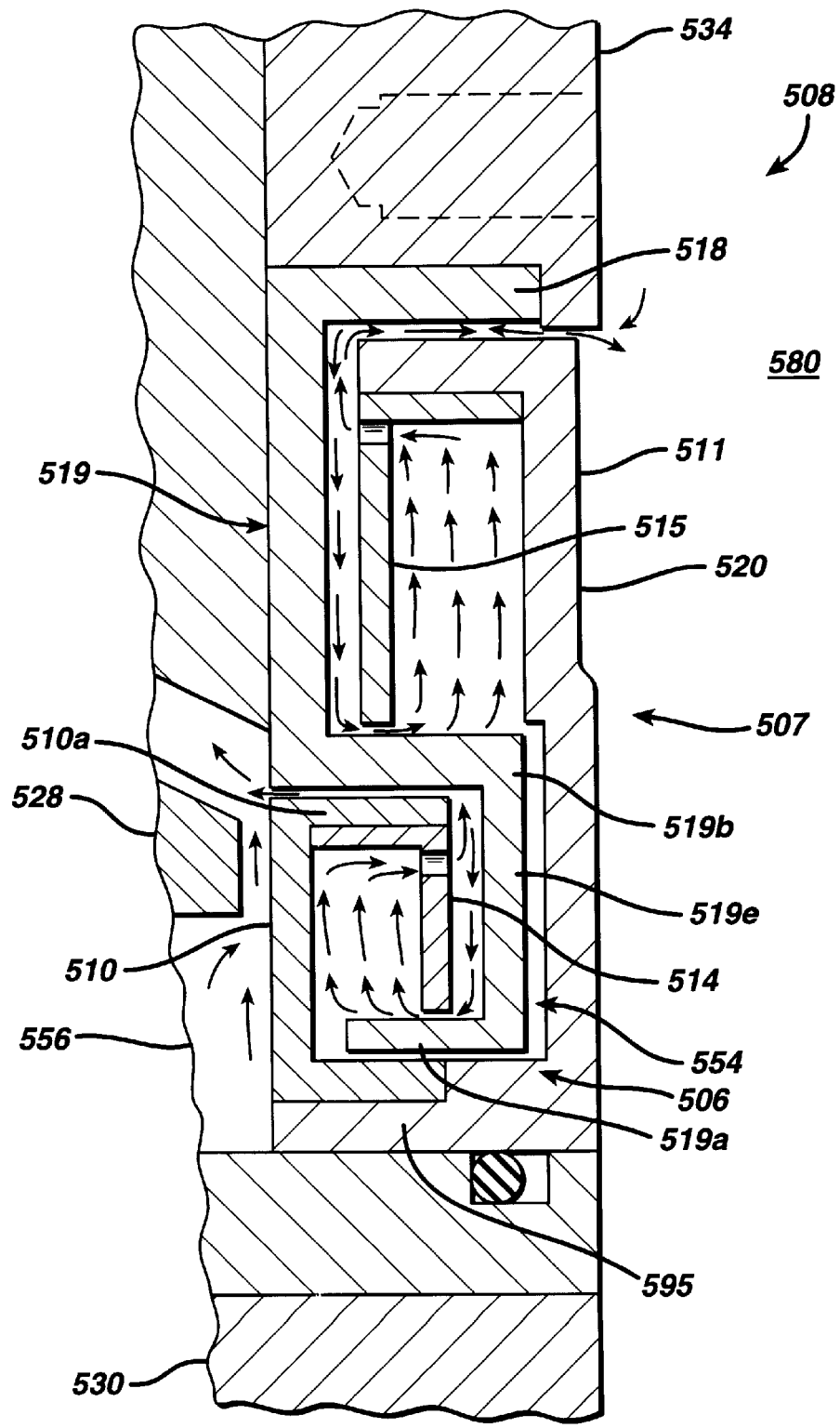
FIG. 8b is a partial cross-sectional side view of another embodiment of the invention for a bearing mounting arrangement on a steel rolling mill shaft, not depicting pumping rings but rather depicting the flow paths of the fluid medium if there were pumping rings in the fluid ring seal system and the axle was rotating, all in accordance with the features of the invention.

Turning to FIGS. 8*a* and 8*b*, systems 408 and 508 each have a contaminant sealing segment positioned relatively over a fluid medium sealing segment. In each, the fluid medium sealing segment rotors 410 and 510 respectively are shrink fit on a hub section outer diameter of the contaminant sealing segment rotors 411 and 511 respectively. For illustration purposes, reference will only be made to system 408 and both are assumed to function analogously except where stated differently. The contaminant rotor 411 is then assembled with a tight slip or interference fit on the outside cylindrical surface of the axial extending bearing shaft 430.

In system 408, the fluid medium rotor fits under the bearing cage in within the fluid medium chamber. Differently, in system 508 the fluid medium rotor fits adjacent to the bearing cage and the fluid medium chamber. In system 408, the fluid medium rotor's inner radial diameter is restricted by the bearing cage's inner radial diameter. However, the radial thickness of the contaminant rotor can be dimensioned appreciably larger and thereby achieve a sturdier construction than may be possible, under the same space constraints, for the 508 system. In system 408, the stator housing 424 is an integral part of the stationary end plate. Differently, on system 508 the contaminant stator housing is preferably a separate component, shrink-fit into the stationary end plate.

In operation, the systems 208, 308, 408 and 508 function analogous to systems 8 and 108 to contain fluid medium within respective sealing segments and prevent contaminants from migrating into the respective fluid medium chambers. These latter configurations provide an additional advantage of preventing occasional water pools, while the bearing assembly is not rotating, from entering the bearing fluid cavity. In this regard, the allowable height of a water pool is related to the most inner diameter "h" of the stator arm 219*a* in the fluid medium sealing segment, see FIG. 9. That is, when considering the seal system inverted (not shown) where the contaminant segment would be under the fluid medium sealing segment since the fluid medium segment is located with a smaller radius than that of the contaminant sealing segment, if the seal system is submerged in water up to the height "h" it could not readily enter the rotor cavity 246.

Figure 9:
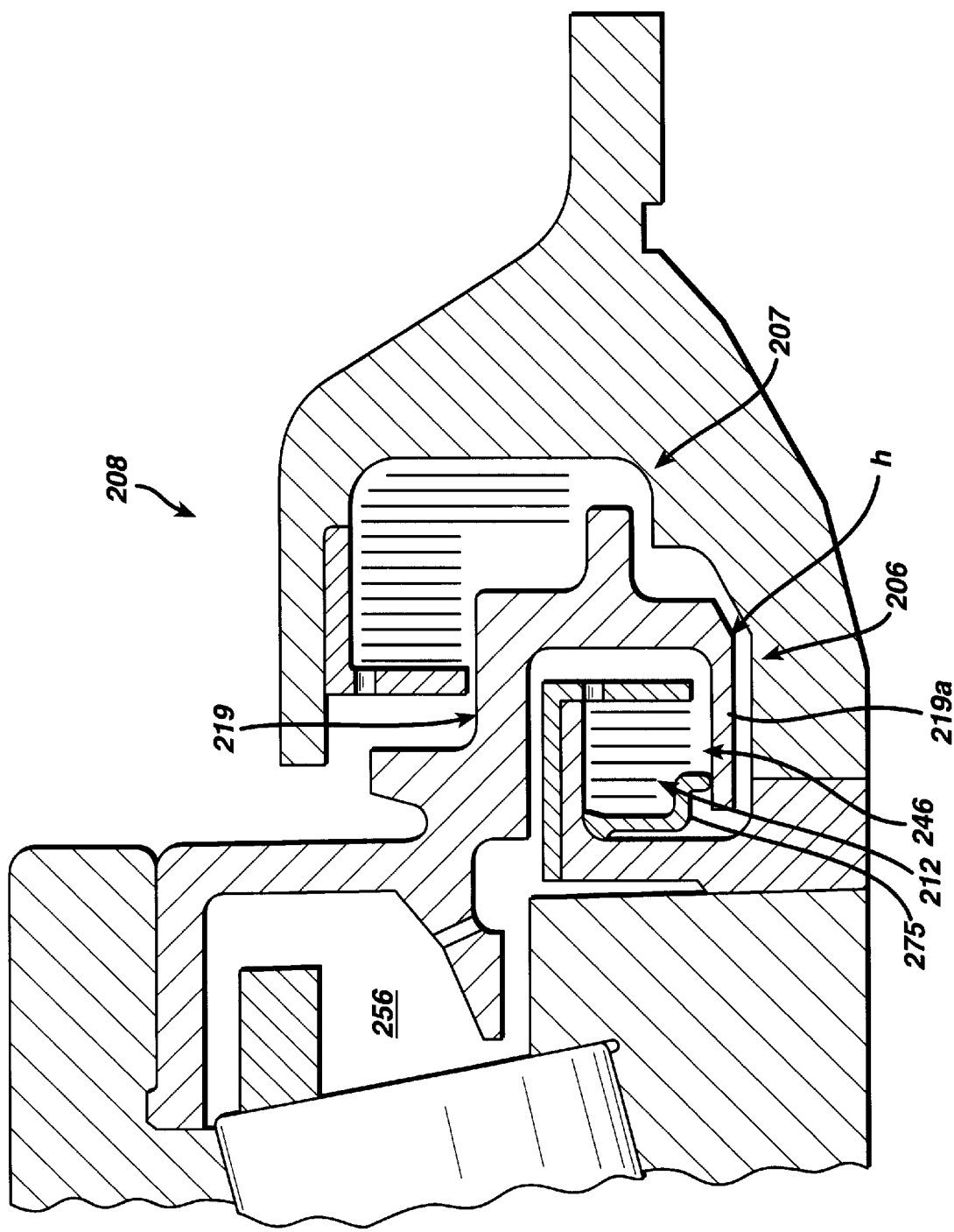
FIG. 9 is a partial cross-sectional side view of yet another embodiment of the invention, similar to that of FIG. 6 but here including a static seal, all in accordance with the features of the invention.

For example, in FIG. 9, if standing water is going to exceed level "h", excellent results are obtained when a simple conventional static-type seal 275 is integrated within the fluid ring seal system, such as an elastomeric seal. In such a case though, the principal function of the static-type seal is to prevent contaminants from entering the system when it is under little to no rotational operation. Preferably, any such static-type seal will lose frictional rubbing contact at a pre-determined axle speed and then rotate freely within the fluid ring seal system without frictional contact with an opposed surface. Accordingly, the desired operating features of the fluid ring seal system, as previously discussed, would predominate during rotation of the bearing shaft and the static-type seal would be employed substantially only during non-rotation of the shaft when extreme contaminant conditions may exist. Further, it may be preferred to have the seal sized and configured, and the pumping rings located adjacent thereto, so that during rotation the rings serve as a stop to prevent the seal from falling too far into the rotor cavity.

For an example considering a use of the invention, reference is first made to the prior art steel rolling mill shaft bearing assembly seen in FIG. 2. Here, the prior art components H, L, E, F, and G could be replaced by the FIGS. 8*a* and/or 8*b* fluid ring seal systems of the present invention. Prior art components B, C, D, D' and J are preferably employed in the present invention as conventionally used in the art. The seal systems here are not inside/outside specific as with the rail car example.

Figure 1A:
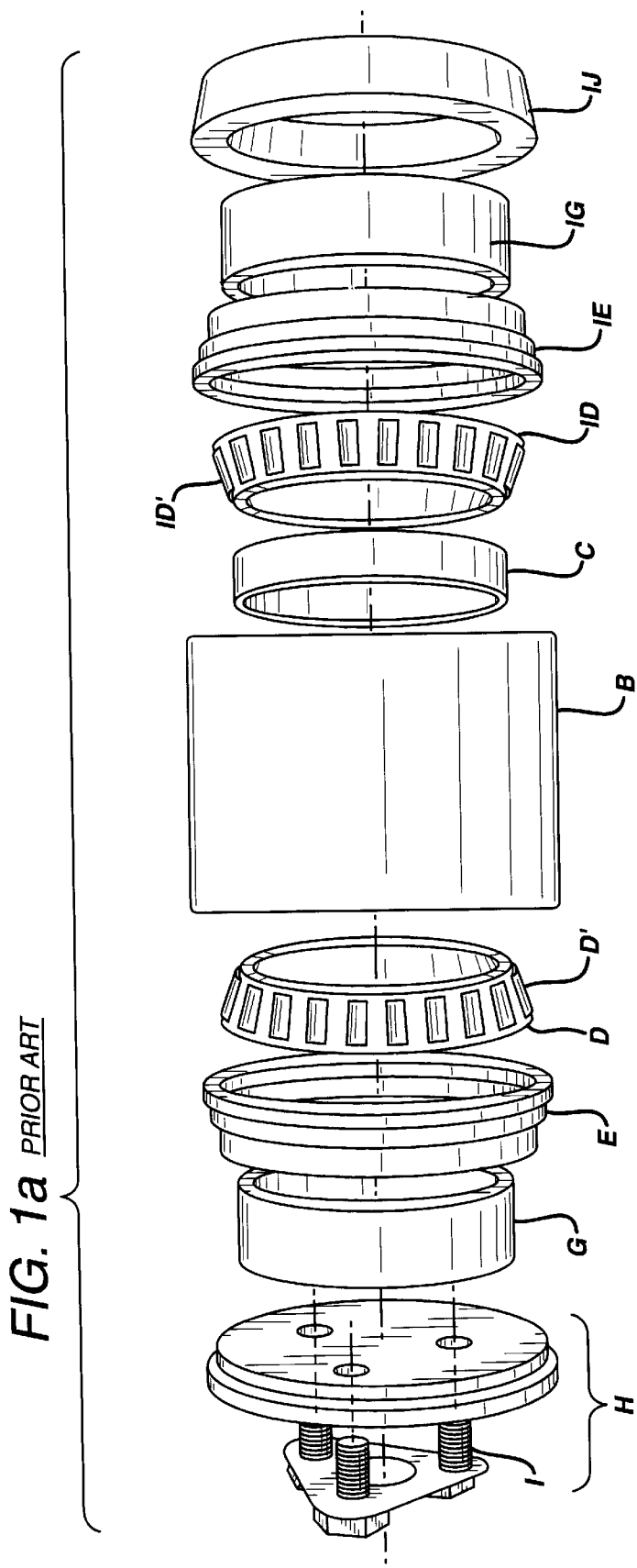
FIG. 1a is an exploded perspective view of a conventional rail car axle bearing assembly employing a conventional static seal system.
Figure 1B:
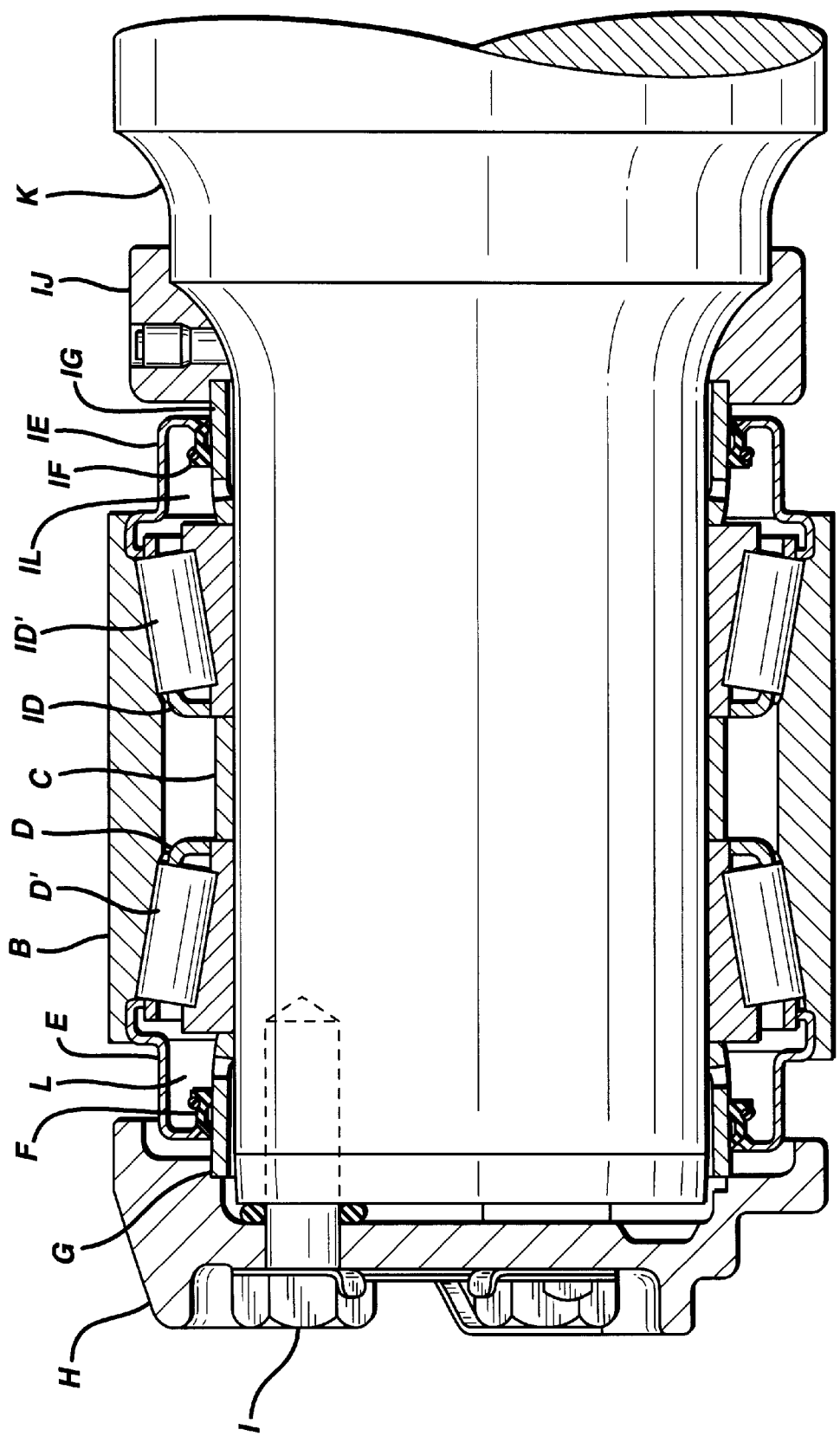
FIG. 1b is an assembled cross-sectional side view of the axle bearing assembly employing the conventional static seal system depicted in FIG. 1, now mounted on an axle.

For an example considering a use of the invention, reference is also made to the prior art in reference to the prior art rail car axle arrangement seen in FIGS. 1*a* and 1*b*, the prior art components H, G, F, L and E could be replaced by the FIG. 7 fluid ring seal system of the present invention. Also, prior art components J, G, E, F and L could be replaced by the FIG. 6 fluid ring seal system of the present invention. Prior art components B, C, D, D', I and K are preferably employed in the present invention as conventionally used in the art.

Figure 10:
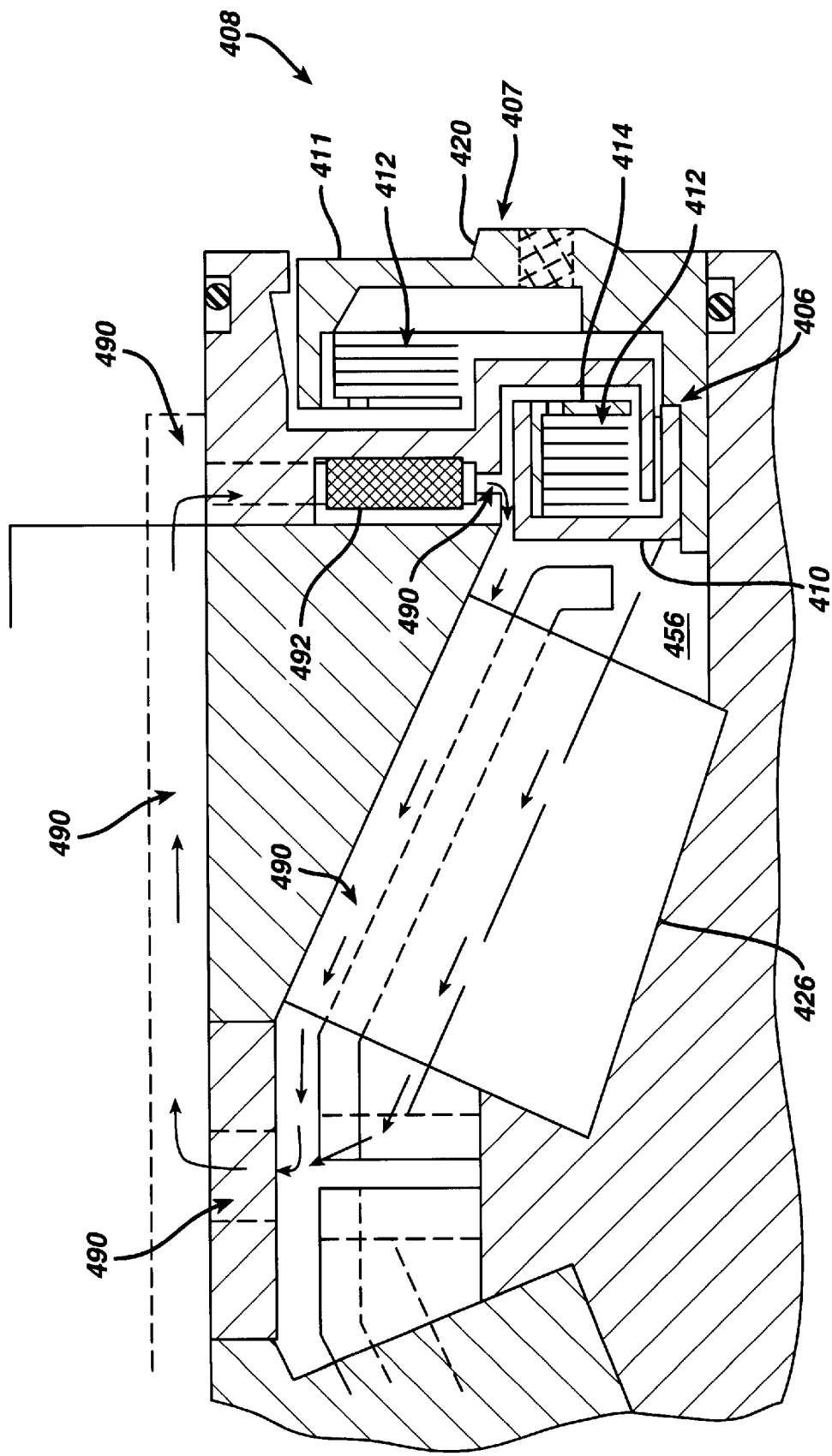
FIG. 10 is a partial cross-sectional side view of yet another embodiment of the invention similar to FIG. 8a, in combination with a fluid medium circulation path and schematically showing the flow of the fluid medium in the system.

Turning to FIG. 10, yet another embodiment of the invention concerns the seal system in combination with a fluid medium circulation path 490. The fluid medium circulation path flows in communication with the fluid medium chamber 456 and the fluid medium sealing segment. Preferably the fluid medium circulation path includes a fluid medium filter 492. The filter may be in a parallel or series relationship with the flow path of the fluid medium circulation path.

In operation, fluid is pumped in the fluid medium circulation path in communication with the fluid medium chamber and a bearing 426 that is part of a bearing assembly, located adjacent to the fluid medium chamber. The fluid may be pumped by utilizing the circulating flow of the fluid medium created by the fluid medium sealing segment to pump the fluid medium through the fluid medium circulation path. Alternatively, pumping may include activating the bearing assembly (i.e., through ordinary rotation during operation) to pump the fluid medium through the fluid medium circulation path. Still alternatively, pumping may include a combination of utilizing the circulating flow of the fluid medium and activating the bearing assembly to pump the fluid medium through the fluid medium circulation path.

As various possible embodiments may be made in the above invention for use for different purposes and as various changes might be made in the embodiments above set forth, it is understood that all of the above matters here set forth or shown in the accompanying drawings are to be interpreted as illustrative and not in a limiting sense.

What is claimed is:

1. A virtually frictionless non-contacting fluid ring seal system in combination with a static housing, the combination for use in sealing a fluid medium lubricated bearing chamber located in a bearing housing encircling a rotatable shaft from contaminants in an environment when the fluid ring seal system and the static housing are mounted encircling the rotatable shaft and adjacent the fluid medium lubricated bearing chamber, comprising:
   a fluid medium sealing segment mountable on the shaft for rotation therewith within, but not in contact with, the static housing and being in fluid flow communication with the lubricated bearing chamber and disposed downstream of the lubricated bearing chamber, said fluid medium sealing segment being configured and effective during rotation to cause an exchange of a fluid medium between itself and the fluid medium lubricated bearing chamber substantially without causing fluid to flow downstream of itself;
   a contaminant sealing segment mountable on the shaft for rotation therewith within, but not in contact with, the static housing and being in fluid flow communication with the environment and disposed downstream of the fluid medium sealing segment, said contaminant sealing segment being configured and effective during rotation to cause an exchange of a fluid between itself and the environment substantially without causing fluid to flow upstream of itself;
   a stator extending inwardly from the static housing toward the shaft to a non-contacting position adjacent thereto, said stator running between the fluid medium sealing segment and the contaminant sealing segment so as to separate one from the other and said stator having an arm extending into each sealing segment for substantially preventing the exchange of fluid or fluid medium between the sealing segments.

2. The system of claim 1 wherein the contaminant sealing segment is axially disposed adjacent the fluid medium sealing segment.

3. The system of claim 1 wherein at least a portion of the contaminant sealing segment is radially larger than the fluid medium sealing segment.

4. The system of claim 3 wherein at least a portion of the contaminant sealing segment surrounds the fluid medium sealing segment.

5. The system of claim 1 wherein the fluid medium sealing segment is disposed radially inside the fluid medium lubricated bearing chamber.

6. The system of claim 1 wherein each sealing segment comprises a rotor mounted on the shaft and a rotor cover joined with the rotor so as to define a rotor cavity therebetween and so as to define a ring cavity between each rotor cover and the stator.

7. The system of claim 6 wherein the rotor cover has at least one hole therein for facilitating fluid flow communication from the rotor cavity to the ring cavity.

8. The system of claim 7 further comprising at least one pumping ring loosely retained within each rotor cavity.

9. The system of claim 6 further comprising a plate mounted on the shaft adjacent the arms of the stator so as to define a pathway therebetween.

10. The system of claim 9 wherein said plate has a reservoir channel formed therein.

11. The system of claim 9 wherein the contaminant sealing segment rotor is spaced from the static housing so as to define a channel therebetween and the contaminant sealing segment communicates with the environment through the channel having an opening and wherein the opening has an inner radius disposed radially larger than an outer radius of the rotatable shaft and an annular space is defined between the inner radius of the opening and the outer radius of the rotatable shaft in the environment adjacent the opening.

12. The system of claim 11 wherein a protective flange is mounted on the shaft adjacent the plate and spaced from the contaminant sealing segment so as to define an outer cavity which is in fluid flow communication with the contaminant sealing segment and the environment and wherein the protective flange, the rotor of the contaminant sealing segment and the plate are integrally formed.

13. The system of claim 1 further comprising a charger ring connected to the static housing within the fluid medium lubricated bearing chamber, said charger ring projecting into the fluid medium lubricated bearing chamber and defining a radial charger channel between itself and the fluid medium sealing segment.

14. The system of claim 13 wherein the charger ring has at least one charger ring hole extending through a portion of the charger ring that is projecting into the fluid medium lubricated bearing chamber.

15. The system of claim 1 wherein the fluid medium lubricated bearing chamber includes a stationary bearing housing encircling the lubricated bearing chamber and the static housing is frictionally engaged therewith, said static housing having a removal ring for pulling the fluid ring seal system from the stationary bearing housing.

16. The system of claim 1 further comprising a static seal mounted within the fluid medium sealing segment wherein the static seal is configured to substantially seal off the fluid medium sealing segment from communication with the contaminant sealing segment when the shaft is substantially non-rotational.

17. The system of claim 16 wherein the static seal is resilient and frictionally contacts the stator when the shaft is substantially non-rotational thereby substantially sealing off the fluid medium sealing segment from communication with the contaminant sealing segment and the static seal falls into the fluid medium sealing segment out of frictional contact with the stator when the shaft is substantially rotational, thereby opening communication between the fluid medium sealing segment and the contaminant sealing segment.

18. The system of claim 11 wherein the fluid medium comprises a member from the group consisting of a gas, a grease, an oil and a combination of a grease and an oil.

19. The system of claim 1 further comprising a fluid medium circulation path in fluid flow communication with the fluid medium lubricated bearing chamber and the fluid medium sealing segment for circulating a flow of the fluid medium through the fluid medium lubricated bearing chamber.

20. The system of claim 19 wherein the fluid medium circulation path includes a fluid medium filter for filtering the fluid medium.

21. The system of claim 20 wherein the fluid medium filter is in a series relationship with the fluid medium circulation path.

22. The system of claim 1 wherein the stator extends from the static housing in a substantially perpendicular relationship with the static housing.

23. The system of claim 22 wherein the stator has a stator body and the arms extend from the stator body in a substantially perpendicular relationship with the stator body.

24. The system of claim 22 wherein each arm has a protrusion ring extending into its respective sealing segment.

25. A virtually frictionless fluid ring seal method for sealing a fluid medium lubricated bearing chamber encircling a rotating shaft from contaminants in an environment, comprising:

creating a lubricating fluid chamber to rotate with the shaft adjacent to and downstream of the bearing chamber, the lubricating fluid chamber including a lubricating fluid medium;

creating a contaminant sealing chamber adjacent to and downstream from the lubricating fluid chamber;

separating the lubricating fluid chamber from the contaminant sealing chamber by a stator surrounding but not contacting the rotating shaft;

using the centrifugal force of rotation on the lubricating fluid medium to cause an exchange of the lubricating fluid medium between the bearing chamber and the lubricating fluid chamber without causing the lubricating fluid medium to flow past the stator downstream of the lubricating fluid chamber;

using the centrifugal force of rotation on air within the contaminant sealing chamber to cause an exchange of air between the contaminant sealing chamber and the environment without causing the air to flow past the stator upstream of the contaminant sealing chamber.

26. The method of claim 25 further comprising preventing the exchange of air or lubricating fluid medium between the lubricating fluid chamber and the contaminant sealing chamber.

27. The method of claim 25 wherein the steps of using include directing a centrifugal flow of lubricating fluid medium or of air respectively into a rotating member of the lubricating fluid chamber and the contaminant sealing chamber respectively.

28. The method of claim 25 wherein the stator is made of a thermally conductive material.

29. The method of claim 28 wherein the first using step includes the step of causing the lubricating fluid medium to flow in contact with an inside surface of the stator and the second using step includes the step of causing the air to flow in contact with an outside surface of the stator.

30. The method of claim 25 further comprising pumping the lubricating fluid medium through a fluid medium circulation path which is in communication with the lubricated bearing chamber and the lubricating fluid chamber.

31. The method of claim 30 wherein the step of pumping includes utilizing a centrifugal flow of the lubricating fluid medium to pump the lubricating fluid medium through the fluid medium circulation path.

32. The method of claim 30 further comprising a bearing assembly adjacent the lubricated bearing chamber and wherein the step of pumping includes activating the bearing assembly to pump the lubricating fluid medium through the fluid medium circulation path.

33. The method of claim 25 wherein the lubricating fluid chamber and the contaminant sealing chamber each include a rotor encircling the shaft and a rotor cover joined therewith so as to define a rotor cavity therebetween and so as to define a ring cavity between each rotor cover and the stator.

34. The method of claim 33 wherein each rotor cover has at least one hole therein and the steps of using comprise flowing the air and the lubricating fluid medium through their respective rotor cavities and ring cavities.

35. The method of claim 34 further comprising at least one pumping ring retained within each rotor cavity.

36. The method of claim 35 further comprising a stationary bearing housing encircling the shaft and the lubricated bearing chamber and a static housing encircling the shaft and the lubricating fluid chamber and the contaminant sealing chamber wherein the stationary bearing housing is frictionally engageable together with the static housing.

37. The method of claim 36 further comprising a preliminary step of assembling together, in any order, the lubricating fluid chamber, the contaminant sealing chamber and the stationary bearing housing.

38. The method of claim 37 wherein the preliminary step of assembling comprises:

nesting the at least one pumping ring adjacent the rotor of the contaminant sealing chamber and joining the rotor cover to the rotor of the contaminant sealing chamber, positioning the static housing and the stator adjacent the contaminant sealing chamber, nesting a second at least one pumping ring adjacent the rotor of the lubricating fluid chamber and joining the rotor cover to the rotor of the lubricating fluid chamber, positioning the lubricating fluid chamber adjacent the static housing on an opposite side of the stator and frictionally engaging the static housing together with the stationary bearing housing.

39. A virtually frictionless fluid ring seal method for sealing a fluid medium lubricated bearing chamber encircling a rotatable shaft from contaminants in the environment, comprising:

rotating a fluid medium sealing chamber encircling the shaft and being disposed downstream of the lubricated bearing chamber;

positively and continuously exchanging a fluid medium between the fluid medium sealing chamber and the lubricated bearing chamber by rotation substantially without causing the fluid medium to flow downstream of the fluid medium sealing chamber;

rotating a contaminant sealing chamber encircling the shaft and being in fluid flow communication with the environment and disposed downstream of the fluid medium sealing chamber and separated therefrom;

positively and continuously exchanging fluid between the contaminant sealing chamber and the environment by rotation substantially without causing the fluid to flow upstream of the contaminant sealing chamber.

* * * * *

UNITED STATES PATENT AND TRADEMARK OFFICE
CERTIFICATE OF CORRECTION

PATENT NO.   : 6,170,832 B1                                         Page 1 of 1
DATED        : January 9, 2001
INVENTOR(S)  : Hermann et al.

It is certified that error appears in the above-identified patent and that said Letters Patent is hereby corrected as shown below:

<u>Column 1,</u>
Line 1, delete the specification and replace with the attached substitute specification <u>Column 14, claim 18,</u>
Line 44, delete "11" and replace with -- 1 --.

<u>Column 14, claim 24,</u>
Line 66, delete "its" and replace with -- the --.

Signed and Sealed this

Second Day of April, 2002

*Attest:*

JAMES E. ROGAN
*Attesting Officer*            *Director of the United States Patent and Trademark Office*

UNITED STATES PATENT AND TRADEMARK OFFICE
CERTIFICATE OF CORRECTION

PATENT NO.    : 6,170,832 B1
DATED         : January 9, 2001
INVENTOR(S)   : Hermann et al.

It is certified that error appears in the above-identified patent and that said Letters Patent is hereby corrected as shown below:

Column 1,
Line 1, delete the specification and replace with the attached substitute specification.

This certificate supersedes Certificate of Correction issued April 2, 2002.

Signed and Sealed this

Twentieth Day of July, 2004

JON W. DUDAS
*Acting Director of the United States Patent and Trademark Office*

FLUID RING SEAL SYSTEM AND METHOD

FIELD OF THE INVENTION

The invention relates generally to the field of sealing a fluid medium. More particularly, the invention concerns fluid ring seals and a system that employs multiple fluid ring seals to seal the fluid medium in a fluid medium chamber and seal contaminants out of the fluid medium chamber, which chamber preferably encircles a shaft mounted for rotation.

BACKGROUND OF THE INVENTION

Various sealing means exist in the prior art for sealing a fluid medium in a fluid medium chamber. In particular, as depicted in FIGS. 1a, 1b and 2, static seals are conventionally used. For example, FIGS. 1a and 1b depict a conventional rail car axle bearing assembly. The assembly includes a bearing assembly housing B. Within the housing B a spacer C is positioned interiorly midway between the housing ends. A bearing cone D, 1D, respectively, comprising a pair of such cones sits inside the housing pressed against either side of the spacer C. A series of bearings D', 1D', respectively, are mounted within the bearing cones D, 1D. A seal ring E, 1E, respectively, sits against the bearing cone D, 1D, respectively, where again a pair of such rings E, 1E, respectively, sit inside the housing pressed against either side of the respective bearing cone D, 1D.

Within the seal ring E, 1E, respectively, is a static seal F, 1F, respectively (FIG. 1b). The static seal engages an outer surface of a wear ring G, 1G, respectively, in a rotatable frictional relationship. The wear ring G, 1G, respectively, sits against the bearing cone D, 1D, respectively, where again a pair of such rings pressingly engage against either side of the respective bearing cone D, 1D. The wear ring G, 1G, respectively, is engaged by either an end plate H with connecting means such as a bolt I (bearing outside mounting arrangement) or a backing plate 1J that removably engages a shoulder of an axle or shaft K. The end plate H and connecting means I enable pre-loading of the bearing assembly as desired.

In rotational operation, for example, the components D, 1D, C, G, 1G, H, I, 1J and K rotate and the components B, E, 1E and F, 1F are fixed or stationary relative thereto. The static seal F, 1F, respectively, rotatably seals by engaging an outer surface of the wear ring G, 1G, respectively, in a rotatable frictional relationship. A fluid medium chamber L, 1L, respectively, is formed between the ring seal E, 1E, respectively, and the bearing cone D, 1D, respectively. A fluid medium such as oil or grease is located within the chamber L 1L, respectively. By the frictional relationship created between the static seal F, 1F, respectively, and the wear ring G, 1G, respectively, the seal F, 1F, respectively, serves to prevent the fluid medium from escaping out of the chamber L, 1L, respectively, and also, prevent contaminants (e.g., substances in an outer environment such as air, water dirt and debris) from migrating into the chamber L, 1L, respectively.

FIG. 2 depicts another example of a bearing assembly that employs a static type seal in a conventional steel rolling mill shaft application. The components of this system are generally analogous to the components of the rail car axle system in function. Obviously the geometry of the components differ but they operate largely the same way. Components in FIG. 2 that correspond to similar components in FIGS. 1a/1b are labeled with the same letter but have a prefix "2" which merely serves to identify them with the steel rolling mill shaft application.

These and other types of bearing assembly arrangements known in the prior art have several disadvantages. Arrangements that employ static seals have a tendency to wear out relatively quickly. Once the static seal looses its ability to consistently maintain frictional contact with the rotating wear ring, leakage into and out of the fluid medium chamber is inevitable. Further, such arrangements attempt to accomplish the two tasks of sealing in the fluid medium and sealing out contaminants with one component. Still further, such arrangements rely on the frictional relationship which has obvious disadvantages to inhibiting free rotation of the rotating system.

Still other arrangements that do not necessarily employ static seals suffer from similar disadvantages. For example, such arrangements do not consider fluid medium flow characteristics or utilize distinct yet cooperating components to circulate the fluid medium into moving walls for fluid containment and/or contaminant prevention and/or temperature regulation. Further, such arrangements do not actively circulate a fluid medium and utilize pressure differentials created by the arrangement to contain the fluid medium and prevent the migration of contaminants. Still further, other disadvantages that exist in the prior art arrangements will become clear after considering the features and advantages of the present invention.

A fluid ring sealing system is needed that overcomes the disadvantages of the prior art sealing arrangements. Accordingly, the present invention includes features that overcome these and other disadvantages. The seals and seal systems disclosed in the prior art do not offer the flexibility and inventive features of my system and method. As will be described in greater detail hereinafter, the features of the present invention differ from those previously proposed.

SUMMARY OF THE INVENTION

According to the present invention there is provided a fluid ring seal system and method for use with a shaft encircled by a fluid medium chamber including a fluid medium. The system includes a fluid medium sealing segment in fluid flow communication with the fluid medium chamber, wherein the fluid medium sealing segment is downstream of the fluid medium chamber and substantially maintains the fluid medium within the fluid medium chamber and the fluid medium sealing segment. The system also includes a contaminant sealing segment in fluid flow communication with the fluid medium sealing segment and with an outer environment, wherein the contaminant sealing segment substantially prevents a contaminant from migrating into the fluid medium sealing segment. Further, the system may include the contaminant sealing segment axially disposed downstream of the fluid medium sealing segment and a fluid pathway extending between the fluid medium sealing segment and the contaminant sealing segment along an innermost radius defined by each respective sealing segment, wherein the sealing segments are preferably in fluid flow communication with each other substantially only through the fluid pathway.

Another feature of the invention relates to the system including, additionally or alternatively, the contaminant sealing segment located downstream of the fluid medium sealing segment and a stator at least partially separating the fluid medium sealing segment and the contaminant sealing segment, the stator having a stator arm extending into a rotor cavity of each of the respective sealing segments.

Still another feature of the invention concerns the axial and/or radial positioning of the sealing segments relative to one another and/or the bearing assembly.

According to other features of the invention there is provided a charger ring located upstream of the fluid medium sealing segment and in the fluid medium chamber, wherein the charger ring automatically maintains a ring of fluid medium in proximity to a radial charger channel defined between the fluid medium sealing segment and the charger ring.

Yet another feature of the invention relates to a fluid medium circulation path, wherein the fluid medium circulation path flows in communication with the fluid medium chamber and the fluid medium sealing segment.

According to still further features of the invention there is provided a method for sealing a fluid medium in and contaminants out of a fluid ring seal system including a fluid medium chamber. Preferably the method comprises the steps of: rotating a fluid medium sealing segment; rotating a contaminant sealing segment; circulating a flow of the fluid medium between the fluid medium sealing segment and the fluid medium chamber and along a stator located between the fluid medium sealing segment and the contaminant sealing segment; circulating a flow of a contaminant between the contaminant sealing segment and the outer environment and along the stator; and, reducing a temperature of the fluid medium as it is circulating between the fluid medium sealing segment and the fluid medium chamber by circulating the flow of fluid medium along a temperature regulated stator.

DESCRIPTION OF THE DRAWINGS

Other features and advantages of my invention will become more readily apparent upon reference to the following description when taken in conjunction with the accompanying drawings, which drawings illustrate several embodiments of my invention.

FIG. 1a is an exploded perspective view of a conventional rail car axle bearing assembly employing a conventional static seal system.

FIG. 1b is an assembled cross-sectional side view of the axle bearing assembly employing the conventional static seal system depicted in FIG. 1a, now mounted on an axle.

FIG. 2 is an assembled partial cross-sectional side view of a conventional steel rolling mill shaft bearing assembly mounted on a shaft and employing a conventional static seal system.

FIG. 3 is a partial cross-sectional side view of an embodiment of the invention for a bearing inside mounting arrangement on a rail car axle, schematically depicting pumping rings mounted in respective sealing segments of the fluid ring seal system, all in accordance with the features of the invention.

FIG. 3a is a partial exploded perspective view of a rotor, pumping rings and rotor cover of the fluid medium sealing segment seen in FIG. 3.

FIG. 4 is a partial cross-sectional side view of an embodiment of the invention for a bearing outside mounting arrangement on a rail car axle, not depicting pumping rings but rather depicting the flow paths of the fluid medium if there were pumping rings in the fluid ring seal system and the axle was rotating, all in accordance with the features of the invention.

FIG. 5 is a partial cross-sectional side view of another embodiment of the invention for any bearing mounting arrangement, here including a charger ring in a fluid medium chamber, all in accordance with the features of the invention.

FIG. 5a is a partial cross-sectional side view of another embodiment of the charger ring of FIG. 5.

FIG. 6 is a partial cross-sectional side view of another embodiment of the invention for a bearing inside mounting arrangement on a rail car axle, schematically depicting pumping rings mounted in respective sealing segments of the fluid ring seal system, all in accordance with the features of the invention.

FIG. 7 is a partial cross-sectional side view of an embodiment of the invention for a bearing outside mounting arrangement on a rail car axle, not depicting pumping rings but rather depicting the flow paths of the fluid medium if there were pumping rings in the fluid ring seal system and the axle was rotating, all in accordance with the features of the invention.

FIG. 8a is a partial cross-sectional side view of an embodiment of the invention for a bearing mounting arrangement on a steel rolling mill shaft, schematically depicting pumping rings mounted in respective sealing segments of the fluid ring seal system, all in accordance with the features of the invention.

FIG. 8b is a partial cross-sectional side view of another embodiment of the invention for a bearing mounting arrangement on a steel rolling mill shaft, not depicting pumping rings but rather depicting the flow paths of the fluid medium if there were pumping rings in the fluid ring seal system and the axle was rotating, all in accordance with the features of the invention.

FIG. 9 is a partial cross-sectional side view of yet another embodiment of the invention, similar to that of FIG. 6 but here including a static seal, all in accordance with the features of the invention.

FIG. 10 is a partial cross-sectional side view of yet another embodiment of the invention similar to FIG. 8a, in combination with a fluid medium circulation path and schematically showing the flow of the fluid medium in the system.

DETAILED DESCRIPTION OF THE PREFERRED EMBODIMENT

Referring now to the drawings, the invention comprises a fluid ring seal system, for example, one embodiment includes the system 8 shown in FIGS. 3 and 3a in a side-by-side sealing segment arrangement. The system 8 contains two main segments, a fluid medium sealing segment 6 and a contaminant sealing segment 7. These two segments operate relatively independently of one another though they rotate together around a common shaft or axle 30. As used herein, the terms downstream and upstream refer to the positioning of a component relative to another component along a fluid path potentially extending from a fluid medium chamber 56 to an outer environment 80 of the system 8.

The fluid medium sealing segment 6 generally comprises that part of the system 8 that is downstream of the fluid medium chamber 56 and upstream of a fluid pathway 54. Preferably, the fluid pathway 54 extends between the fluid medium sealing segment 6 and the contaminant sealing segment 7 along an innermost radius 45 and 47 defined by each respective sealing segment. Still further, it is preferred that the sealing segments are in fluid flow communication with each other substantially only through the fluid pathway 54. The sealing segment 6 includes at least a fluid medium rotor 10, a fluid medium rotor cover 14, a fluid medium rotor cavity 46 and a fluid medium ring cavity 50. Inside rotor 10 are a number of similar pumping rings 12. The rotor cover 14 has at least one discharge hole 16 which communicates fluid between the interior of rotor cavity 46 and the fluid cavity 50.

Preferably, three to twelve holes 16 will be located around the periphery of the rotor cover 14. The holes are preferably sized large enough to allow fluid medium to exit the rotor cavity 46 sufficiently during rotation to preferably maintain a flow of fluid medium between the fluid medium sealing segment 6 and the fluid medium chamber 56. Preferably, each hole 16 is positioned adjacent the inside diameter of rotor 10 so as to prevent the pooling of fluid between rotor cover 14 and a portion of the rotor 10 adjacent an outside radius 12b of the pumping rings during operation or rotation of the system. However, the holes 16 could be positioned inwardly away from the inside diameter of the rotor 10 and the features of the invention could still be practiced.

It is understood that the seal in question can be located on a rolling axle or shaft 30 and that the rotor 10, preferably friction or interference fit together with rotor cover 14, and pumping rings 12 all rotate with the axle. The pumping rings 12 are captured in the ring shaped rotor cavity 46 created by rotor 10 and rotor cover 14. Although the pumping rings are only shown schematically in the drawings, they preferably have particular characteristics and comprise the number of rings necessary to at least partially fill the rotor cavity, as discussed further herein.

For example, still referring to FIG. 3, the pumping rings are somewhat spaced apart from one another by having a wavy structure or raised surfaces (not shown) to cause spacing. Also, the outside radius 12b of each ring is preferably sized slightly smaller than the inner radius of the horizontal portion 10a of the rotor 10. Further, the inside radius 12a of each ring is preferably sized the same or slightly smaller than the inner radius of the rotor cover 14 adjacent thereto. This sizing is particularly advantageous because it is preferred that the rings 12 axially and radially float within the rotor cavity 46. Such sizing also further enables the fluid collected at the outside radius 12b of the rings to circulate out of the rotor cavity through the holes 16. The rings may be constructed out of any semi-rigid to rigid material that has a flexible characteristic. Although largely dependent on intended use, excellent results are contemplated when the rings are constructed of any metal material, e.g., galvanized sheet metal, aluminum flashing or stainless steel.

During shaft rotation, the sealing segment 6 rotates and in turn the rings 12 rotate. This rotation causes fluid medium to be circulated from the inside ring diameter 12a to the outside ring diameter 12b and expelled at discharge hole 16. Because the rotor cover 14 is also rotating, the fluid being discharged will circulate along the surface of that cover to the outer periphery 14a and some of the fluid will be transferred inwardly along the surface of stationary stator 19 and/or the interior wall of stator housing 18. Any such fluid medium that makes its way to gap 52 will eventually reach the inside diameter 12a of the pumping rings again wherein it will be circulated back to the outer diameter 12b thereof and out the hole 16. This action is continuous and it substantially prevents the fluid medium from entering fluid pathway 54, and especially preferably during shaft rotation.

The principle purpose of the fluid medium sealing segment 6 is to prevent the loss of fluid medium from fluid medium chamber 56. The fluid medium may comprise any member from the group consisting of a gas, a grease, an oil, a combination of a grease and an oil or the like that one desires to maintain within the fluid medium chamber 56. The sealing segment 6 is effective in so maintaining the fluid medium because fluid that escapes from chamber 56 through fluid medium sealing segment channel 58 will circulate along stator housing 18 to the stator 19 and eventually find its way to gap 52. Upon passing through gap 52 it will generally be picked up or sucked by the pumping rings 12 and returned to the outer diameter 12b thereof and forced out of hole 16. Little, and preferably no fluid, can pass into fluid pathway 54 so that there comes a point during shaft rotation when no more fluid can leave chamber 56, thus preventing the loss of fluid therefrom.

To better ensure that the circulating fluid is picked up by the pumping rings 12, the stator 19 preferably has stator arm 19a, reaching axially into the rotating rotor cavity 46 of the fluid medium sealing segment. The stator arm 19a is joined with, preferably rigidly in one piece as shown, a stator body 19e, and preferably in a perpendicular relationship thereto. Further, excellent results are also obtained when a stator arm protrusion ring 19c is included with the stator arm. With these preferred features, circulating fluid is thereby better directed into the radial gaps 12c between the pumping rings 12 and is substantially prevented from reaching the pathway 54.

The exact pattern of fluid flow between the fluid medium sealing segment 6 and chamber 56 is not known with certainty. However, it is known that there is an exchange of fluid between the two, as generally shown in FIG. 4 (described further hereinafter) for example. Positive flow of the fluid medium from the interior of the segment 106 to the channel 158 is practically assured. The fluid medium in the channel 158 and ring cavity 150 proximate the stator 119 substantially rotates at slightly less than half the speed of the rotating seal rotor 110. Thus, the fluid medium inside the rotor cavity 146 and in proximity to the rotor cover 114 rotates at practically the same angular velocity as the pumping rings (not shown) and rotor 110 and rail car axle 30, and therefore is subject to higher pressure forces.

It is also believed that there is a secondary fluid flow phenomenon which is akin to boundary layer fluid flow dynamics which permits a layer of fluid to move in one direction along the stationary walls (e.g., the stator housing 118 and stator 119) while the boundary flow on the rotating surfaces (e.g., rotor 110 and rotor cover 114) is moving in another direction. This constant exchange or circulating of fluid maintains an equilibrium and any possible leaking fluid medium is substantially prevented from escaping into pathway 154 after passing through gap 152.

Turn now to the contaminant sealing segment 7, FIG. 3 for example. This segment generally comprises that part of the system 8 that is downstream of the fluid pathway 54 and upstream of an outer environment 80 and outer ring cavity 38. The mechanical structure and function here is analogous to that shown and described for the fluid medium sealing segment 6. In operation, segment 7 functions as follows. First, the contaminant sealing segment 7 preferably does not contain a fluid medium. It is preferably in communication with mainly ambient air at ambient air pressure in the outer ring cavity 38. As the pumping rings 13 rotate, a similar action occurs as occurred with the fluid in the fluid medium sealing segment 46. That is, air and particles, or water (i.e., a contaminant) that might enter the ring cavity fluid channel 59 and find its way into the rotor cavity 48 of the contaminant sealing segment, will be circulated or pumped centrifugally and will be emitted through hole 17 into contaminant ring cavity 51.

Here again, because of the boundary layer action, some of the contaminants will be drawn radially inwardly along stator 19 and can find their way to the contaminant gap 53 and the inner diameter of the pumping rings 13. This action substantially prevents any air, particles, dirt (i.e. collectively contaminants) from finding their way to fluid pathway 54. Thus, there is preferably an effectively blocked fluid pathway 54 extending between the contaminant sealing segment 7 and the fluid medium sealing segment 6. Furthermore, the pumping action by each respective sealing segment 6, 7 can positively pressurize each sealing segment and thereby serves to further prevent the exchange of fluid or contaminants through the fluid pathway 54. Within the contaminant sealing segment 7, the stator 19 also preferably includes a stator arm 19b and protrusion ring 19d, effective in a similar way as the arm 19a and ring 19c.

The backing plate 20 (FIG. 3) preferably comprises a unitary piece including the rotor 11 and a substantial portion of the bearing housing assembly, for reasons described hereinafter. The configuration of backing plate 20 and removal lip 40 is such that rain and other contaminants are more effectively prevented from entering the sealing system. First, removal lip 40 is shaped so that any rain falling on the stator housing 18 will be prevented from flowing directly into the outer ring cavity 38. Instead, it will simply drop off the bottom portion of stator housing 18. Also, backing plate 20 is provided with a protective flange 44 which helps block the entry of rain or contaminants from being projected in the direction of the outer ring cavity 38. If any such contaminant should happen to find its way into outer ring cavity 38, it will simply flow to the bottom of the cavity and be discharged at the bottom. Preferably, very little, if any, will enter channel 59.

An additional feature concerns grease reservoir 42 located in pathway 54. The reservoir serves as a small fluid medium reservoir during the initial fluid ring seal system installation phase. The reservoir 42 can be provided with a grease or other type lubricating fluid medium prior to the system 8 installation.

Another aspect of this invention concerns a complimentary embodiment comprising a second side-by-side fluid ring seal system 108, FIG. 4. The system 108 comprises a bearing outside mounting arrangement whereas the system 8 (FIG. 3) comprises a bearing inside mounting-arrangement. In application, a pair of fluid ring seal systems 8 and 108 seal fluid medium in a pair of opposed axle bearings, such as the bearing mounting arrangement seen in FIGS. 1a and 1b in a conventional system. For example, system 8 is positioned adjacent the inside of a typical rail car axle bearing and system 108 is positioned adjacent the outside of a typical rail car axle bearing. Together, the systems 8 and 108 axially locate and assist in pre-loading a typical rail car axle bearing 22, 26 (FIG. 3), 122, 126 (FIG. 4), on the rail car axle 30. Moreover, these systems serve to maintain the presence of fluid medium within the axle bearing assembly and prevent contaminants from migrating therein. The end plate 134 (FIG. 4) has a protective flange 144, similar in function to the protective flange 44 (FIG. 3).

Bearing pre-loading is accomplished by a bolt 185 (FIG. 4), for example (and preferably three bolts), bolting the end plate 134 to the axle 30, as conventionally known. The end plate inner ring 135 is thereby forced against rotor 110. In turn, the rotor 110 presses against bearing inner ring or cone 122 and then the axial clamping force acts through the contact surfaces of bearing inner ring 22 (FIG. 3) of rotor 10 which in turn is forced against backing plate inner ring 21 and the backing plate 20. Backing plate 20, however, firmly abuts against the axle shoulder 32 and thus acts as a stop to any force applied against it from the direction of the rotor 10. In this way, the bolts in the end plate 134 axially clamp all bearing and seal rotor parts against axle shoulder 32. By selectively adjusting the torque applied to the bolts, the pre-loading of the bearings 26 and 126 (e.g. tapered roller bearings 26, 126, respectively, separated from each other by bearing cage 28, 128, respectively, in the bearing ring 22, 122, respectively) can be controlled.

The components and operation of system 108 are very similar to those of system 8, except that system 108 is inverted relative to system 8. The backing plate 20 corresponds to the end plate 134 in operation but they differ slightly in configuration and connection to the rail car axle. Otherwise, as shown in the drawing figures, corresponding system components are numbered similarly and differ essentially only by a numbering increment of 100.

The side-by-side systems 8, 208 (FIGS. 3, 6, respectively) and 108, 308 (FIGS. 4, 7, respectively) can be further characterized by their positioning relative to one another. For example, it is preferred that the contaminant sealing segment 7, 107, 207, 307, respectively, may be axially disposed opposing the fluid medium sealing segment 6, 106, 206, 306, respectively, where at least a portion of the contaminant sealing segment is concentric with the fluid medium sealing segment, as in FIGS. 3, 4, 6 and 7 for example. Still further in this regard the contaminant sealing segment 7, 107, respectively, may be substantially axially side-by-side with the fluid medium sealing segment 6, 106, respectively, as seen in FIGS. 3 and 4 for example.

In combination (referring to FIGS. 3 and 4 for example, the respective fluid medium sealing segments 6, 106, respectively, and the contaminant sealing segments 7, 107, respectively, of each system 8 and 108 function to prevent leakage of fluid medium out of the chambers 56 and 156 respectively and the ingress of contaminants into those chambers. This invention has a further advantage of dividing the tasks of sealing fluid within the fluid medium chamber 56, 156, respectively, and preventing a contaminant from migrating into the fluid medium chamber. It preferably confines them to two related, yet separate, sealing segments comprising the fluid ring seal system 8 or 108, without the serious side effects of friction.

As should be well understood and as depicted in the drawings, the systems 8 and 108 preferably do not rely on or employ frictional relationships between rotating and stationary seal components to prevent leakage of fluid medium out of or contaminants into the system during rotation. The system is preferably essentially a non-frictional system. For example, in reference to system 8 (FIG. 3), the pumping rings 12, 13, respectively, within each rotor cavity 46, 48, respectively, are loosely retained there and can move independently of each other and the respective rotors 10 and 11. The rotors and the pumping rings are preferably not in contact with the stator 19, but rather are preferably separated therefrom and move relative thereto. Generally, to avoid frictional and wearing body contact between rotating and stationary seal components, all stator and rotor surfaces of the sealing segments are preferably separated by a gap of at least nominal size (e.g., about 0.1 to 1.0 mm). Consequently, this invention produces a system that lasts longer, considerably reduces power consumption and overall provides a more reliable, durable sealing arrangement with little to no leakage.

Further, still referring to FIGS. 3 and 4 for example, the features of the invention enhance bearing performance because the fluid medium sealing segment 6, 106, respectively, of this invention generates little friction and utilizes a temperature reducing feature provided by the combination of the sealing segments 6, 7 and 106, 107, respectively. That is, the contaminant sealing segment 7, 107, respectively, is air cooled (e.g., as represented by the flow arrows in FIG. 4 in chamber 151) and serves to cool the stator 19 therebetween and in turn the stator 19 cools a flow of fluid medium coming into contact therewith in the cavity 50, 150, respectively. Substantially lower fluid medium temperatures have been measured in field-like experimentation, as compared to temperatures measured in bearing arrangements using conventional seals.

Still further, the inherently low friction prevailing in the fluid ring seal system 8, 108, respectively, minimizes air/ fluid medium temperature increases inside the operating fluid ring seal assembly itself. This, in turn, translates to a lower overall fluid medium chamber 56, 156, respectively, and bearing assembly or cone (22, 26, 28 and 122, 126, 128, respectively) operating temperature and longer fluid medium life.

Yet further, the configuration and operation of this fluid ring seal system 8, 108, respectively, promotes fluid medium circulation in an active fashion through critical locations in the bearing assembly (e.g., the shoulder section 70, 170 (FIGS. 3 and 4), respectively) thereby lowering bearing frictional losses and contributing to better bearing lubrication at lower operating temperatures within the bearing assembly.

Further features of the invention concern the special geometry and configurations that make the systems 8 and 108 easy to assemble and disassemble in components. For example, stator arms 19a, 19b, 119a, 119b and respective protrusion rings 19c, 19d, 119c, 119d are preferably dimensioned to the same or smaller diameter as the rotor covers 14, 15 and 114, 115, respectively, to allow simple rotor assembly with the stator housing 18, 118, respectively. During assembly, the covers 14, 15 and 114, 115, respectively, and the pumping rings 12, 13 and 112 (not shown), 113 (not shown), respectively, are positionable past the arms 19a, 19b and 119a, 119b, respectively, and protrusion rings 19c, 19d and 119c, 119d, respectively, into an assembled position as shown in FIGS. 3 and 4.

As another example, stator housings 18 and 118 have removal rings 40 and 140, respectively. These rings serve not only to keep contaminants out of the systems 8, 108, respectively, but also to be engageable with a tool for installing and removing the systems 8 and 108 to and from the stationary bearing housings 24 and 124, respectively, and rail car axle 30. The system 8 is maintained in position relative to the tapered roller bearing 26 by the combination of backing plate 20 which is removably fixed to the axle 30 by conventional means, and stator housing 18 which is removably fixed to stationary bearing housing 24 via an integral snap ring 61 engaging into snap ring groove 60. The system 108 is similarly maintained in position by corresponding components.

Still further preferred features of the invention concern the backing plate 20 and end plate 134. Preferably these are configured to engage not only the axle 30, but to also serve as the rotors 11 and 111 for contaminant sealing segments 7, 107, respectively. In this way, the number of system components is reduced as compared to existing traditional elastomeric sealing systems that require completely separate components for the sealing system. However, separate components could be utilized as desired to practice the features of this invention. For example, in reference to the prior art rail car axle arrangement seen in FIGS. 1a and 1b, the prior art components H, G, F, L and E could be replaced by the FIG. 4 fluid ring seal system of the present invention. Also, prior art components 1J, 1G, 1E, 1F and 1L could be replaced by the FIG. 3 fluid ring seal system of the present invention. Prior art components B, C, D, 1D, D', 1D', I and K are preferably employed in the present invention as conventionally used in the art.

The components of the present invention that replace the just listed prior art components could be constructed of any rigid material. However, though depending on use and except as stated differently herein, excellent results are obtained when the components (FIGS. 3 and 4), e.g., rotors 10, 11 and 110, 111, respectively, rotor covers 14, 15 and 114, 115, respectively, stator 19, 119, respectively, stator housing 18, 118, respectively, and backing plate 20 and end plate 134 are made of metal. For example, in a rail car application cast iron may be preferred whereas in a steel rolling mill application it may be machined steel, cast steel, stamped steel or stainless steel formed by such a process.

Another embodiment of this invention includes a charger ring 65, as seen in FIGS. 5 and 5a. This ring could be combined with either system 8 or 108 shown in FIGS. 3 and 4, where reference is made here to system 8 as an example. The ring 65 includes a charger ring gap 67 defined between the inner diameter of the ring 65 and the bearing inner ring 22. The ring 65 may also include a charger ring hole 69, described hereafter. In between the charger ring 65 and the rotor 10 is a radial charger channel 68.

The charger ring 65 is connected to the stationary stator housing 18 by appropriate means, such as welding, bonding, fastening, forming integral, or the like. The charger ring 65 automatically maintains and/or retains, before and during axle rotation, under preferably most to all operating conditions, fluid medium around the outer periphery of the rotor 10, i.e., proximate the channel 68 in communication with the fluid channel 58. In particular, the charger ring causes fluid medium to form a ring of fluid medium 64 in cavity 68. In effect then, the entire fluid medium chamber 56 and components 22, 26 and 28 of the system are sealed off from the outside environment 80 because of the fluid medium ring 64. For example, the fluid medium ring can act as a barrier to humid atmospheric air entering channel 58 in any mode of operation ranging from high speed axle rotation to no speed axle rotation. That is, the fluid medium ring 64 better effectively closes off any gas conveying fluid passageway that may form between the boundary layers in channel 58.

During axle rotation, still referring to FIG. 5, the pumping and recirculation action occurring because of the fluid medium sealing segment 6, as previously discussed (FIGS. 3 and 4), causes fluid medium 95 to automatically circulate through charger ring hole 69 (preferably comprising a number of such holes around the radius of the ring 65) and the gap 67. The inner diameter of the fluid medium ring 64 is determined by the inner diameter of the charger ring hole 69. Through circulation along the stationary charger ring wall 66, fluid migrates or circulates back through gap 67 into the bearing cavity 56 and is purposely directed against the face of the bearing 26 to enhance bearing lubrication, such as at the shoulder section 70. Also, due to the recirculation of fluid between the fluid medium sealing segment 6 and the chamber 56, any frictional heat generated in the cavities 68 and 56 by the rotating fluid medium, or by other means, is preferably automatically regulated to the temperature level of the fluid medium in the fluid medium sealing segment 6, as discussed previously (FIGS. 3 and 4).

FIG. 5a shows another embodiment of the charger ring 65. Here, the hole 69 is located along a portion of the charger ring projecting away from the fluid medium sealing segment 6, rather than parallel to the rotor 10. In certain situations, the projection away location is preferred for maintaining a smaller ring 64 (FIG. 5) of fluid in proximity to the charger channel 68.

Another embodiment of this invention comprises fluid ring seal systems 208, 308, 408 and 508 as seen in FIGS. 6, 7, 8a, 8b, 9 and 10, which are configured as "over-under" systems. These systems are structurally and functionally analogous to the systems 8 and 108, except as noted hereafter. As shown in the drawing figures, corresponding system components are numbered similarly to those of system 8 and 108, respectively, and differ essentially only by a numbering increment of 200, 300, 400 and 500 respectively.

Generally, systems 208, 308, 408 and 508 differ from systems 8 and 108 in that systems 208, 308, 408 and 508 comprise an over-under configuration wherein their respective contaminant sealing segment 207, 307, 407, 507, respectively, is positioned in the system relatively over the fluid medium sealing segment 206, 306, 406, 506, respectively. That is, the contaminant sealing segment may be disposed at a first radius greater than a second radius of the fluid medium sealing segment and at least a portion of the contaminant sealing segment may be in different axial planes from the fluid medium sealing segment, e.g., FIGS. 6, 7, 8a, 8b and 9. Alternatively, the contaminant sealing segment 407, 507, respectively, could be substantially completely in different axial planes from the fluid medium sealing segment 406, 506, respectively, e.g., FIGS. 8a, 8b and 10.

One obvious advantage to this configuration is it enables a more compact fluid ring seal system 208, 308, 408, 508, respectively, regarding axial spacing. This is particularly desirable in the systems 408 and 508 (FIGS. 8a and 8b) which are adapted for use as steel rolling mill fluid ring seal assemblies, because seal system space is limited to minimize rolling mill shaft deflection. For example, even at large rolling mill shaft bearing diameters, the fluid ring seal system can be within one-half axial inch thick or even smaller.

Turning to FIGS. 6 and 7, systems 208 and 308 each have a contaminant sealing segment 207, 307, respectively, positioned relatively over a fluid medium sealing segment 206, 306, respectively. In system 308 (FIG. 7), the contaminant rotor 311 is an integral part of the end plate 334, while the fluid medium rotor 310 is a separate component for ease of assembly. Preferably, the stator 319 and stator housing 318 are integral parts and are fitted into the stationary bearing housing 324 by a snap ring 361 in an analogous way as systems 8 and 108.

System 208 (FIG. 6) is very analogous in structure and function to that of system 308 (FIG. 7). In both systems 208 and 308, preferably the stator housing 218, 318, respectively, is also equipped with a charger ring 265 and 365 respectively. For illustration purposes, reference will only be made to system 308 (FIG. 7) and both are assumed to function analogously except where stated differently. In operation, fluid medium located radially outward by the bearing rollers 326 and bearing cage 328 will recirculate radially inwardly along the inside of housing wall 318. The moving fluid will then penetrate through hole 369 and fill the radial charger channel 368. Next, the fluid will be forced by fluid ring seal rotor 310 rotation into the gap 367 between stationary charger ring 365 and rotating bearing ring 322 and forced into the free spaces between the bearing 326. Thereby fluid is directed to the bearing ring shoulder section 370 and opposing bearing faces for effectively recirculating fluid medium into bearing cavities. The channel 368 and the gap 367 preferably remain filled with fluid medium and effectively prevent the influx of possible humid air into the bearing cavity 356.

Turning to FIGS. 8a and 8b, systems 408 and 508 each have a contaminant sealing segment 407, 507, respectively, positioned relatively over a fluid medium-sealing segment 406, 506, respectively. In each, the fluid medium sealing segment rotors 410 and 510 respectively are shrink fit on a hub section 495, 595, respectively, outer diameter of the contaminant sealing segment rotors 411 and 511 respectively. For illustration purposes, reference will only be made to system 408 (FIG. 8a) and both are assumed to function analogously except where stated differently. The contaminant rotor 411 is then assembled with a tight slip or interference fit on the outside cylindrical surface of the axial extending bearing shaft 430.

In system 408, the fluid medium rotor 410 fits under the bearing cage 428 in the fluid medium chamber 456. Differently, in system 508 (FIG. 8b) the fluid medium rotor 510 fits adjacent to the bearing cage 528 and the fluid medium chamber 526. In system 408, the fluid medium rotor 410 outer radial diameter 414a is restricted by the bearing cage 428 inner radial diameter 428a. However, the radial thickness of the contaminant rotor 411 can be dimensioned appreciably larger and thereby achieve a sturdier construction than may be possible, under the same space constraints, for the 508 system. In system 408, the stator housing 418 is an integral part of the stationary end plate 434. Differently, on system 508 the stator housing 518 is preferably a separate component, shrink-fit into the stationary end plate 534.

In operation, the seal systems 208, 308, 408 and 508 function analogous to systems 8 and 108 to contain fluid medium within respective sealing segments and prevent contaminants from migrating into the respective fluid medium chambers. These latter configurations (FIGS. 6, 7, 8a and 8b) provide an additional advantage of preventing occasional water pools, while the bearing assembly is not rotating, from entering the bearing fluid medium chamber 256, 356, 456, 556, respectively. In this regard, the allowable height of a water pool is related to the most inner diameter "h" of the stator arm 219a in the fluid medium sealing segment 206, see FIG. 9. That is, when considering the seal system vertically inverted (not shown), where the contaminant segment 207 would be under the fluid medium sealing segment 206 since the fluid medium segment is located with a smaller radius than that of the contaminant sealing segment, if the seal system is submerged in water up to the height "h", water could not readily enter the rotor cavity 246.

For example, in FIG. 9, if standing water is going to exceed level "h", excellent results are obtained when a simple conventional static-type seal 275, such as an elastomeric seal, is integrated within the fluid ring seal system 206. In such a case though, the principal function of the static-type seal is to prevent contaminants from entering the system 206 when it is under little to no rotational operation. Preferably, any such static-type seal will lose frictional rubbing contact at a pre-determined axle speed and then rotate freely within the fluid ring seal system 208 without frictional contact with an opposed surface. Accordingly, the desired operating features of the fluid ring seal system, as previously discussed, would predominate during rotation of the bearing shaft and the static-type seal 275 would be employed substantially only during non-rotation of the shaft when extreme contaminant conditions may exist. Further, it may be preferred to have the seal 275 sized and configured, and the pumping rings 212 located adjacent thereto, so that during rotation the rings serve as a stop to prevent the seal 275 from falling too far into the rotor cavity 246.

For an example considering a use of the invention, reference is first made to the prior art steel rolling mill shaft bearing assembly seen in FIG. 2. Here, the prior art components 2H, 2L, 2E, 2F, and 2G could be replaced by the FIGS. 8a and/or 8b fluid ring seal systems of the present invention. Prior art components 2B, 2C, 2D, 2D' and 2J are preferably employed in the present invention as conventionally used in the art. The seal systems 408 and 508 here are not inside/outside specific as with the rail car example.

For an example considering a use of the invention, reference is also made to the prior art rail car axle arrangement seen in FIGS. 1a and 1b. The prior art components H, G, F, L and E could be replaced by the FIG. 7 fluid ring seal system of the present invention. Also, prior art components IJ, 1G, 1E, 1F and 1L could be replaced by the FIG. 6 fluid ring seal system of the present invention. Prior art components B, C, D, 1D, D', 1D', I and K are preferably employed in the present invention as conventionally used in the art.

Turning to FIG. 10, yet another embodiment of the invention concerns the seal system 408 in combination with a fluid medium circulation path 490. The fluid medium circulation path 490 flows in communication with the fluid medium chamber 456 and the fluid medium sealing segment 406. Preferably the fluid medium circulation path 490 includes a fluid medium filter 492. The filter may be in a parallel or series relationship with the flow path of the fluid medium circulation path 490.

In operation, fluid is pumped in the fluid medium circulation path 490 in communication with the fluid medium chamber 456 and a bearing 426 that is part of a bearing assembly, located adjacent to the fluid medium chamber 456. The fluid may be pumped by utilizing the circulating flow of the fluid medium created by the fluid medium sealing segment 406 to pump the fluid medium through the fluid medium circulation path. Alternatively, pumping may include activating the bearing assembly (i.e., through ordinary rotation during operation) to pump the fluid medium through the fluid medium circulation path 490. Still alternatively, pumping may include a combination of utilizing the circulating flow of the fluid medium and activating the bearing assembly to pump the fluid medium through the fluid medium circulation path 490.

As various possible embodiments may be made in the above invention for use for different purposes and as various changes might be made in the embodiments above set forth, it is understood that all of the above matters here set forth or shown in the accompanying drawings are to be interpreted as illustrative and not in a limiting sense.

What is claimed is:

1. A virtually frictionless non-contacting fluid ring seal system in combination with a static housing, the combination for use in sealing a fluid medium lubricated bearing chamber located in a bearing housing encircling a rotatable shaft from contaminants in an environment when the fluid ring seal system and the static housing are mounted encircling the rotatable shaft and adjacent the fluid medium lubricated bearing chamber, comprising:

a fluid medium sealing segment mountable on the shaft for rotation therewith within, but not in contact with, the static housing and being in fluid flow communication with the lubricated bearing chamber and disposed downstream of the lubricated bearing chamber, said fluid medium sealing segment being configured and effective during rotation to cause an exchange of a fluid medium between itself and the fluid medium lubricated bearing chamber substantially without causing fluid to flow downstream of itself;

a contaminant sealing segment mountable on the shaft for rotation therewith within, but not in contact with, the static housing and being in fluid flow communication with the environment and disposed downstream of the fluid medium sealing segment, said contaminant sealing segment being configured and effective during rotation to cause an exchange of a fluid between itself and the environment substantially without causing fluid to flow upstream of itself;

a stator extending inwardly from the static housing toward the shaft to a non-contacting position adjacent thereto, said stator running between the fluid medium sealing segment and the contaminant sealing segment so as to separate one from the other and said stator having an arm extending into each sealing segment for substantially preventing the exchange of fluid or fluid medium between the sealing segments.

2. The system of claim 1 wherein the contaminant sealing segment is axially disposed adjacent the fluid medium sealing segment.

3. The system of claim 1 wherein at least a portion of the contaminant sealing segment is radially larger than the fluid medium sealing segment.

4. The system of claim 3 wherein at least a portion of the contaminant sealing segment surrounds the fluid medium sealing segment.

5. The system of claim 1 wherein the fluid medium sealing segment is disposed radially inside the fluid medium lubricated bearing chamber.

6. The system of claim 1 wherein each sealing segment comprises a rotor mounted on the shaft and a rotor cover joined with the rotor so as to define a rotor cavity therebetween and so as to define a ring cavity between each rotor cover and the stator.

7. The system of claim 6 wherein the rotor cover has at least one hole therein for facilitating fluid flow communication from the rotor cavity to the ring cavity.

8. The system of claim 7 further comprising at least one pumping ring loosely retained within each rotor cavity.

9. The system of claim 6 further comprising a plate mounted on the shaft adjacent the arms of the stator so as to define a pathway therebetween.

10. The system of claim 9 wherein said plate has a reservoir channel formed therein.

11. The system of claim 9 wherein the contaminant sealing segment rotor is spaced from the static housing so as to define a channel therebetween and the contaminant sealing segment communicates with the environment through the channel having an opening and wherein the opening has an inner radius disposed radially larger than an outer radius of the rotatable shaft and an annular space is defined between the inner radius of the opening and the outer radius of the rotatable shaft in the environment adjacent the opening.

12. The system of claim 11 wherein a protective flange is mounted on the shaft adjacent the plate and spaced from the contaminant sealing segment so as to define an outer cavity which is in fluid flow communication with the contaminant sealing segment and the environment and wherein the protective flange, the rotor of the contaminant sealing segment and the plate are integrally formed.

13. The system of claim 1 further comprising a charger ring connected to the static housing within the fluid medium lubricated bearing chamber, said charger ring projecting into the fluid medium lubricated bearing chamber and defining a radial charger channel between itself and the fluid medium sealing segment.

14. The system of claim 13 wherein the charger ring has at least one charger ring hole extending through a portion of the charger ring that is projecting into the fluid medium lubricated bearing chamber.

15. The system of claim 1 wherein the fluid medium lubricated bearing chamber includes a stationary bearing housing encircling the lubricated bearing chamber and the static housing is frictionally engaged therewith, said static housing having a removal ring for pulling the fluid ring seal system from the stationary bearing housing.

16. The system of claim 1 further comprising a static seal mounted within the fluid medium sealing segment wherein the static seal is configured to substantially seal off the fluid medium sealing segment from communication with the contaminant sealing segment when the shaft is substantially non-rotational.

17. The system of claim 16 wherein the static seal is resilient and frictionally contacts the stator when the shaft is substantially non-rotational thereby substantially sealing off the fluid medium sealing segment from communication with the contaminant sealing segment and the static seal falls into the fluid medium sealing segment out of frictional contact with the stator when the shaft is substantially rotational, thereby opening communication between the fluid medium sealing segment and the contaminant sealing segment.

18. The system of claim 1 wherein the fluid medium comprises a member from the group consisting of a gas, a grease, an oil and a combination of a grease and an oil.

19. The system of claim 1 further comprising a fluid medium circulation path in fluid flow communication with the fluid medium lubricated bearing chamber and the fluid medium sealing segment for circulating a flow of the fluid medium through the fluid medium lubricated bearing chamber.

20. The system of claim 19 wherein the fluid medium circulation path includes a fluid medium filter for filtering the fluid medium.

21. The system of claim 20 wherein the fluid medium filter is in a series relationship with the fluid medium circulation path.

22. The system of claim 1 wherein the stator extends from the static housing in a substantially perpendicular relationship with the static housing.

23. The system of claim 22 wherein the stator has a stator body and the arms extend from the stator body in a substantially perpendicular relationship with the stator body.

24. The system of claim 22 wherein each arm has a protrusion ring extending into the respective sealing segment.

25. A virtually frictionless fluid ring seal method for sealing a fluid medium lubricated bearing chamber encircling a rotating shaft from contaminants in an environment, comprising:

creating a lubricating fluid chamber to rotate with the shaft adjacent to and downstream of the bearing chamber, the lubricating fluid chamber including a lubricating fluid medium;

creating a contaminant sealing chamber adjacent to and downstream from the lubricating fluid chamber;

separating the lubricating fluid chamber from the contaminant sealing chamber by a stator surrounding but not contacting the rotating shaft;

using the centrifugal force of rotation on the lubricating fluid medium to cause an exchange of the lubricating fluid medium between the bearing chamber and the lubricating fluid chamber without causing the lubricating fluid medium to flow past the stator downstream of the lubricating fluid chamber;

using the centrifugal force of rotation on air within the contaminant sealing chamber to cause an exchange of air between the contaminant sealing chamber and the environment without causing the air to flow past the stator upstream of the contaminant sealing chamber.

26. The method of claim 25 further comprising preventing the exchange of air or lubricating fluid medium between the lubricating fluid chamber and the contaminant sealing chamber.

27. The method of claim 25 wherein the steps of using include directing a centrifugal flow of lubricating fluid medium or of air respectively into a rotating member of the lubricating fluid chamber and the contaminant sealing chamber respectively.

28. The method of claim 25 wherein the stator is made of a thermally conductive material.

29. The method of claim 28 wherein the first using step includes the step of causing the lubricating fluid medium to flow in contact with an inside surface of the stator and the second using step includes the step of causing the air to flow in contact with an outside surface of the stator.

30. The method of claim 25 further comprising pumping the lubricating fluid medium through a fluid medium circulation path which is in communication with the lubricated bearing chamber and the lubricating fluid chamber.

31. The method of claim 30 wherein the step of pumping includes utilizing a centrifugal flow of the lubricating fluid medium to pump the lubricating fluid medium through the fluid medium circulation path.

32. The method of claim 30 further comprising a bearing assembly adjacent the lubricated bearing chamber and wherein the step of pumping includes activating the bearing assembly to pump the lubricating fluid medium through the fluid medium circulation path.

33. The method of claim 25 wherein the lubricating fluid chamber and the contaminant sealing chamber each include a rotor encircling the shaft and a rotor cover joined therewith so as to define a rotor cavity therebetween and so as to define a ring cavity between each rotor cover and the stator.

34. The method of claim 33 wherein each rotor cover has at least one hole therein and the steps of using comprise flowing the air and the lubricating fluid medium through their respective rotor cavities and ring cavities.

35. The method of claim 34 further comprising at least one pumping ring retained within each rotor cavity.

36. The method of claim 35 further comprising a stationary bearing housing encircling the shaft and the lubricated bearing chamber and a static housing encircling the shaft and the lubricating fluid chamber and the contaminant sealing chamber wherein the stationary bearing housing is frictionally engageable together with the static housing.

37. The method of claim 36 further comprising a preliminary step of assembling together, in any order, the lubricating fluid chamber, the contaminant sealing chamber and the stationary bearing housing.

38. The method of claim 37 wherein the preliminary step of assembling comprises:

nesting the at least one pumping ring adjacent the rotor of the contaminant sealing chamber and joining the rotor cover to the rotor of the contaminant sealing chamber, positioning the static housing and the stator adjacent the contaminant sealing chamber, nesting a second at least one pumping ring adjacent the rotor of the lubricating fluid chamber and joining the rotor cover to the rotor of the lubricating fluid chamber, positioning the lubricating fluid chamber adjacent the static housing on an opposite side of the stator and frictionally engaging the static housing together with the stationary bearing housing.

39. A virtually frictionless fluid ring seal method for sealing a fluid medium lubricated bearing chamber encircling a rotatable shaft from contaminants in the environment, comprising:

rotating a fluid medium sealing chamber encircling the shaft and being disposed downstream of the lubricated bearing chamber;

positively and continuously exchanging a fluid medium between the fluid medium sealing chamber and the lubricated bearing chamber by rotation substantially without causing the fluid medium to flow downstream of the fluid medium sealing chamber;

rotating a contaminant sealing chamber encircling the shaft and being in fluid flow communication with the environment and disposed downstream of the fluid medium sealing chamber and separated therefrom;

positively and continuously exchanging fluid between the contaminant sealing chamber and the environment by rotation substantially without causing the fluid to flow upstream of the contaminant sealing chamber.

* * * * *